(12) United States Patent
Aihara

(10) Patent No.: US 7,738,734 B2
(45) Date of Patent: Jun. 15, 2010

(54) IMAGE PROCESSING METHOD

(75) Inventor: Nobuhiro Aihara, Osaki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 12/230,521

(22) Filed: Aug. 29, 2008

(65) Prior Publication Data

US 2009/0010541 A1  Jan. 8, 2009

Related U.S. Application Data

(63) Continuation of application No. 10/614,511, filed on Jul. 8, 2003, now Pat. No. 7,437,017.

(30) Foreign Application Priority Data

Jul. 12, 2002 (JP) ............................... 2002-204557

(51) Int. Cl.
*G06K 9/36* (2006.01)
(52) U.S. Cl. ..................... 382/291; 382/203; 382/289
(58) Field of Classification Search ................ 382/190, 382/216, 203, 289, 291
See application file for complete search history.

(56) References Cited

U.S. PATENT DOCUMENTS

| 2,952,075 | A | * | 9/1960 | Davis ........................... 33/1 A |
| 4,706,205 | A | | 11/1987 | Akai et al. |
| 4,710,803 | A | * | 12/1987 | Suzuki et al. ................ 348/275 |
| 5,335,093 | A | * | 8/1994 | Imoto ......................... 358/487 |
| 5,430,550 | A | * | 7/1995 | Hashimoto et al. .......... 358/488 |
| 5,608,541 | A | | 3/1997 | Yamada |
| 5,774,579 | A | * | 6/1998 | Wang et al. .................. 382/176 |
| 5,825,309 | A | * | 10/1998 | Matsui et al. ................. 341/50 |
| 6,178,270 | B1 | | 1/2001 | Taylor et al. |
| 6,456,732 | B1 | | 9/2002 | Kimbell et al. |
| 6,493,470 | B1 | | 12/2002 | Ikeda et al. |
| 6,885,776 | B2 | | 4/2005 | Takakura et al. |
| 6,963,349 | B1 | | 11/2005 | Nagasaki |
| 7,065,261 | B1 | | 6/2006 | Horie |

FOREIGN PATENT DOCUMENTS

| JP | 5-328096 | A | | 12/1993 |
| JP | 7-200858 | A | | 8/1995 |
| JP | 10276316 | A | * | 10/1998 |
| JP | 2000-36902 | A | | 2/2000 |
| JP | 2000-165639 | A | | 6/2000 |
| JP | 2000-341501 | A | | 12/2000 |
| JP | 2001-101399 | A | | 4/2001 |

* cited by examiner

*Primary Examiner*—Matthew C Bella
*Assistant Examiner*—Dennis Rosario
(74) *Attorney, Agent, or Firm*—Buchanan Ingersoll & Rooney PC

(57) ABSTRACT

In accordance with an image processing method, a data region is detected from input image data. The input image data is rotated in accordance with inclination of an image. Determination is made whether the data region of rotated image data protrudes from an image area of the input image data. When detection is made of protruding, the smallest area including the data region is extracted from the rotated image data. When the data region of the rotated image data protrudes from the image area of the image data previous to rotation, the smallest region including the data region of the rotated image data is extracted from the rotated image data. Therefore, loosing information from image data subjected to rotational correction can be prevented. Also, the amount of image data subjected to rotational correction can be minimized.

26 Claims, 20 Drawing Sheets

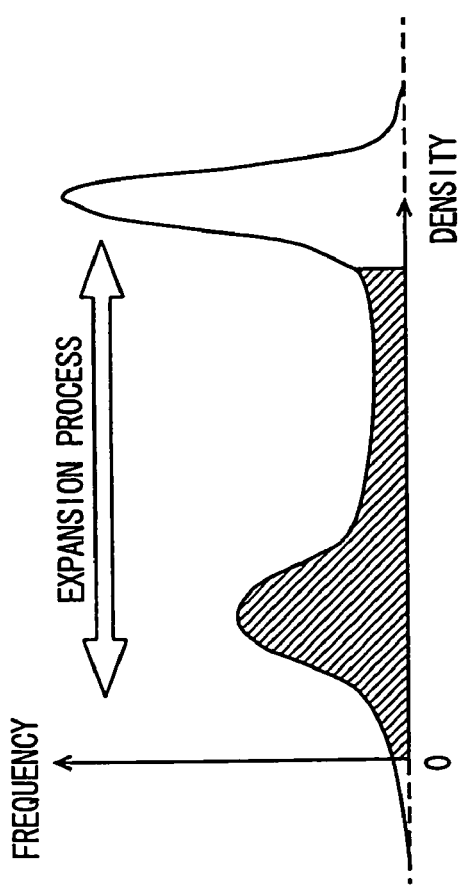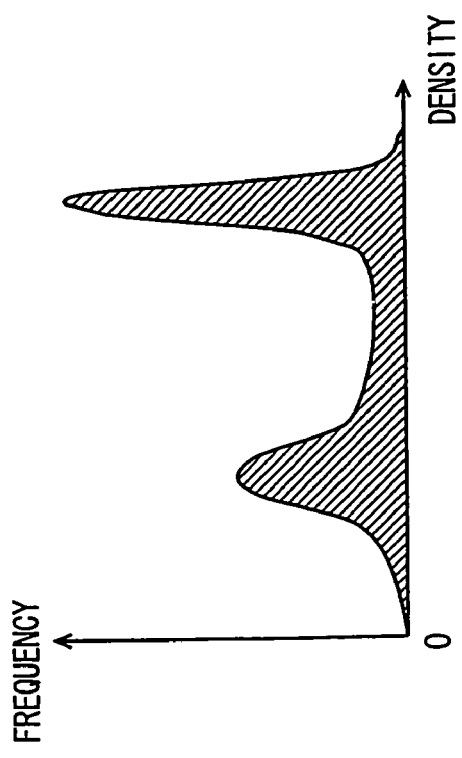
FIG. 4A
FIG. 4B

SELECT TYPE OF DOCUMENT FROM BELOW:

| TEXT/PICTURE | TEXT/DIAGRAM | TEXT/RULE MARK |
| TEXT | DIAGRAM | |
| PICTURE | RULE MARK | |

F I G. 1 8
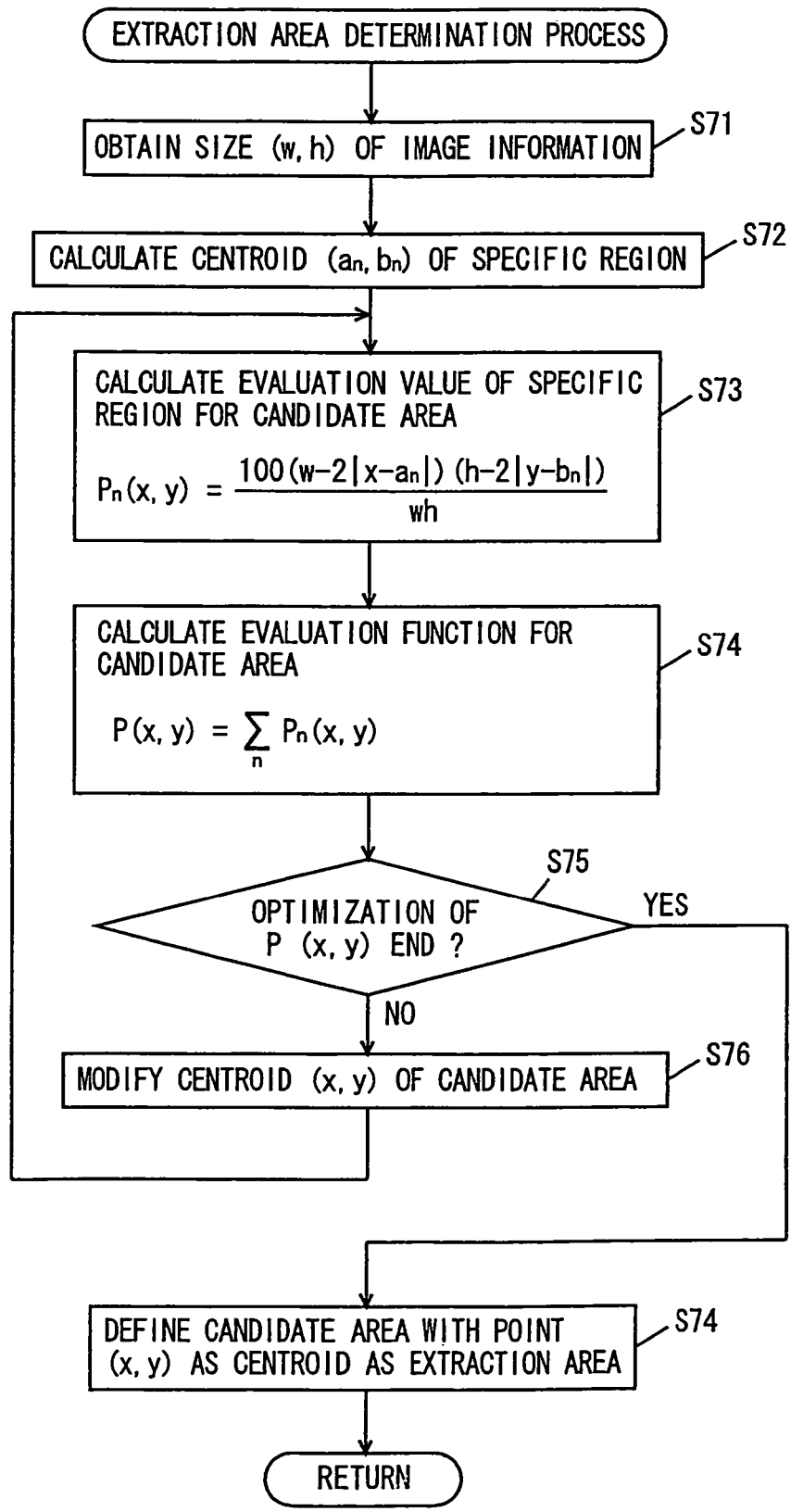

IMAGE PROCESSING METHOD

The present invention is a continuation of application Ser. No. 10/614,511, filed Jul. 8, 2003, which claims priority under 35 USC §119 to Japanese Application No. 2002-204557, filed Jul. 12, 2002, the entire contents of which are hereby incorporated by reference.

BACKGROUND OF THE INVENTION

1. Field of the Invention

The present invention relates to image processing methods, and more particularly, to an image processing method suitable for image correction.

2. Description of the Related Art

In order to convert text information, diagram information, picture information and the like on a recording medium (document) such as a paper sheet into electronic data, the document is generally read through an image input apparatus such as an image scanner or a digital camera.

In the image processing apparatus disclosed in the aforementioned Japanese Laid-Open Patent Publication No. 2000-36902, the operation was tedious since the operator had to determine the extraction area. Also, there was a possibility that an unnecessarily large area of the extraction area may be specified. In such a case, image information including a large amount of useless area will be extracted. This means that a large amount of information not required is included, leading to image information of a large amount being extracted. This image processing apparatus requires the operator to designate the extraction area. The position of the information in the extraction area depends on the manipulation of the operator. There is a possibility that information in the extracted image will be disproportioned in one direction.

SUMMARY OF THE INVENTION

An object of the present invention is to provide an image processing method that can prevent loosing information from image information subjected to rotational correction, and that can minimize the amount of data in the image information subjected to rotational correction.

An image processing method comprising a first step of detecting a data region in input image data, a second step of rotating the input image data in accordance with inclination of an image within the input image data, a third step of detecting whether the rotated data region protrudes from the input image data, and a fourth step of extracting the smallest area including the rotated data region when protrusion is detected at the third step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are density histograms to describe the under color removal process carried out by the image processing apparatus of the first embodiment.

FIG. 18 is a flow chart of an extraction area determination process carried out by the image processing apparatus of the second embodiment.

DESCRIPTION OF THE PREFERRED EMBODIMENTS

Figure 1:
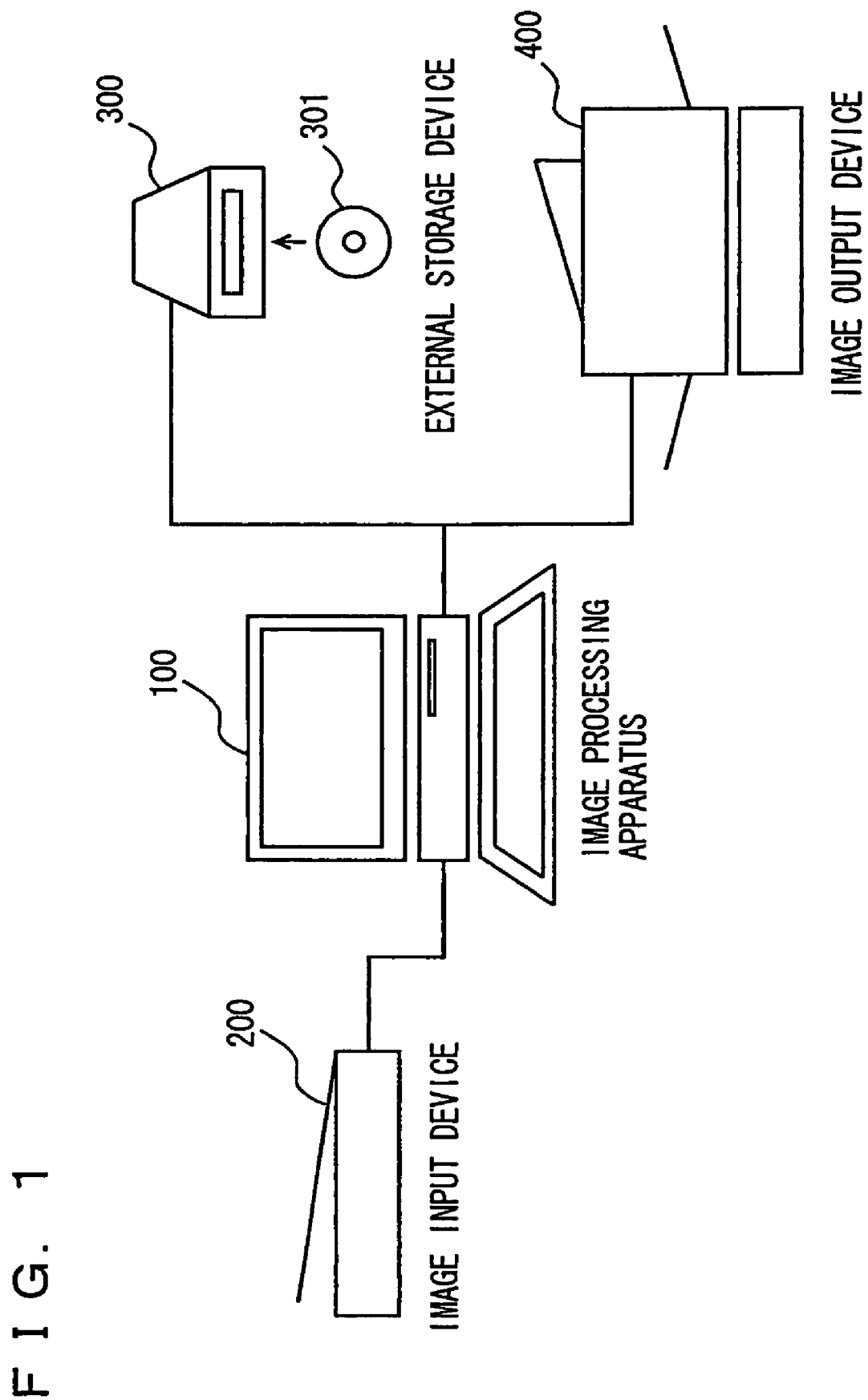
FIG. 1 shows an example of a structure of an image processing system according to an embodiment of the present invention.

Embodiments of the present invention will be described hereinafter with reference to the drawings. In the drawings, the same reference characters represent the same or corresponding components. Therefore, description thereof will not be repeated.

As an approach to prevent loosing information of a protruding area from an output image among the input image, Japanese Laid-Open Patent Publication No. 2000-36902 mentioned in Description of the Related Art discloses an image processing apparatus displaying an input image that is rotated and corrected with an extraction area in an overlapping manner to determine the position of the extraction area through designation of an operator and extracting the determined extraction area.

Description will be provided on the aforementioned "protruding area" as a preamble to the present invention based on the inventor's view.

Figure 21A:
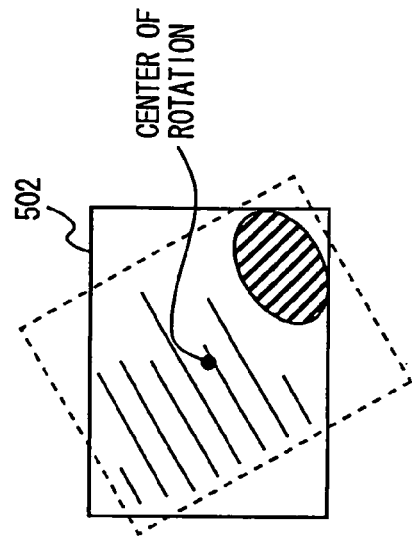
FIGS. 21A-21C are diagrams to describe image processing carried out by an image processing apparatus.
Figure 21B:
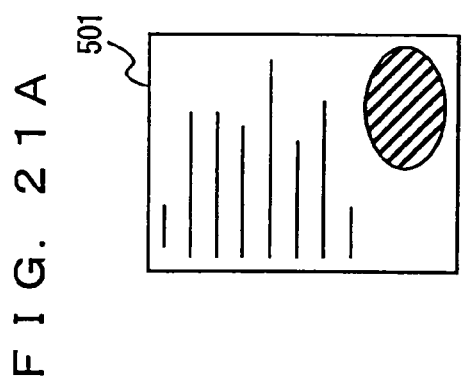

In the case where the document is set inclined with respect to the image scanner as shown in FIG. 21A, or when the document is image-sensed by a digital camera in an inclined manner, text information, diagram information, picture information and the like included in the image information as electronic data obtained through the image scanner or digital camera may be inclined as shown in FIG. 21B. This inclination is defined by an angle referenced to a certain side of a rectangle of the image information.

Figure 21C:
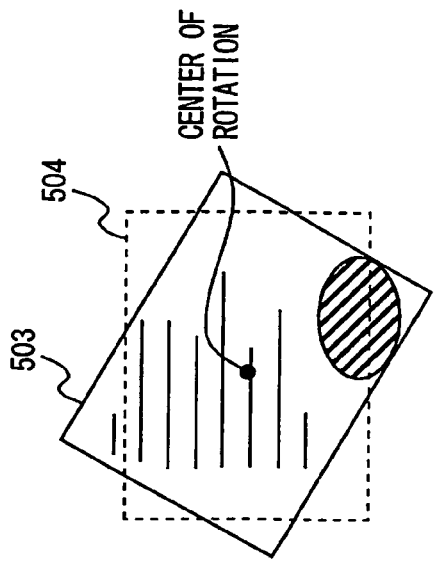

To correct this inclination, inclination of the information included in the obtained image information with respect to the image information is detected. Then, the image information is rotated by an angle of rotation corresponding to the detected inclination for conversion of the image information as shown in FIG. 21C. Thus, rotational correction is conducted to compensate for the inclination.

This rotational correction was based on a predetermined coordinate position, for example, the centroid, of image information previous to rotational correction. Therefore, the image information subjected to rotational correction may partially be located out from the area of the original image information previous to rotational correction as shown in FIG. 21C. In the case where image information is present in the protruding area, information in that protruding area will be lost. There is also a problem that, since the position of information in the extraction area is not taken into account, information may be disproportioned in one direction in the extracted image.

First Embodiment

FIG. 1 shows an example of a structure of an image processing system according to an embodiment of the present invention. Referring to FIG. 1, an image processing system of the first embodiment includes an image processing apparatus 100, an image input device 200, an external storage device 300, and an image output device 400.

Image processing apparatus 100 is formed of a computer such as a personal computer (referred to as PC hereinafter). Image processing apparatus 100 includes a control unit to provide entire control of image processing apparatus 100, an input unit to enter predetermined information into image processing apparatus 100, an output unit to provide predetermined information from image processing apparatus 100, a storage unit to store predetermined information, and a communication unit identified as an interface to connect image processing apparatus 100 on a network.

Image input device 200 is a scanner, a digital camera, or the like to pick up an image, temporarily store the image information obtained, and output the temporarily stored image information. Image input device 200 is connected to image processing apparatus 100 to provide image information to image processing apparatus 100.

External storage device 300 is a FDD (Floppy (R) Disk Drive), HDD (Hard Disk Drive), CD (Compact Disk) drive, MO (Magneto Optical disk) drive or the like to read in programs and data stored in a storage medium 301 for transmission to image processing apparatus 100. In response to designation from image processing apparatus 100, required information such as image information processed at image processing apparatus 100 is written into a record medium 301.

A computer readable recording medium 181 is a recording medium storing a program such as a magnetic tape, a cassette tape, a magnetic disk such as a floppy (R) disk or a hard disk, an optical disk such as a CD-ROM (Compact Disk Read Only Memory), DVD (Digital Versatile Disk), a magneto optical disk such as a MO, MD (Mini Disc), a memory card such as an IC card or an optical card, or a semiconductor memory such as a mask ROM, EPROM (Erasable Programmable Read Only Memory), EEPROM (Electrically Erasable and Programmable Read Only Memory), or a flash ROM.

Image output device 400 is a printer or the like to output image information onto a medium such as a paper sheet. Image output device 400 is connected to image processing apparatus 100 to output image information processed by image processing apparatus 100.

Figure 2:
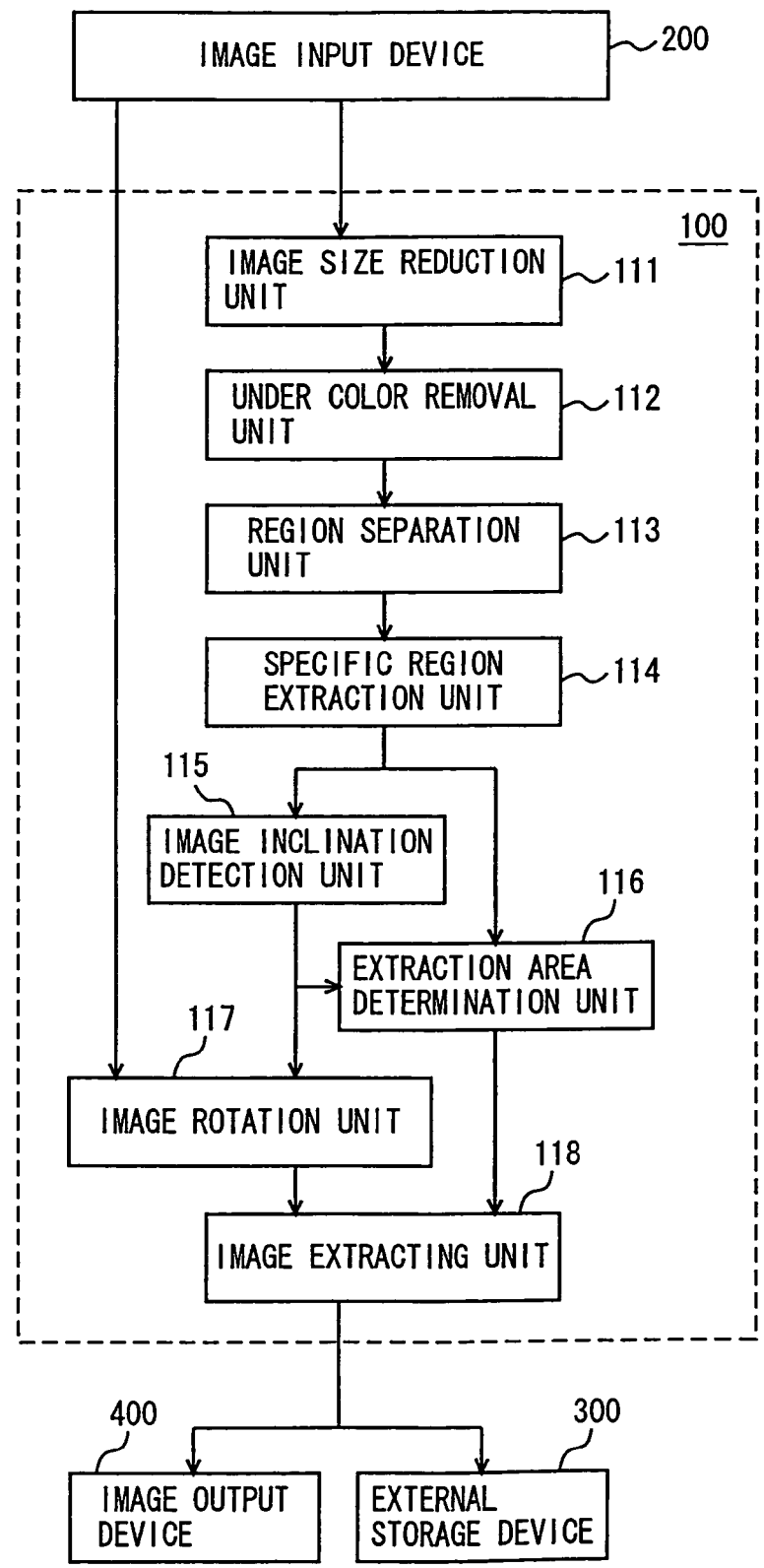
FIG. 2 is a functional block diagram of an image processing apparatus according to a first embodiment.

FIG. 2 is a functional block diagram of image processing apparatus 100 of the first embodiment. Referring to FIG. 2, image processing apparatus 100 includes an image size reduction unit 111 reducing image information input from image input device 200, an under color removal unit 112 to remove under color from image information reduced at image size reduction unit 111, a region separation unit 113 to separate image information subjected to under color removal at under color removal unit 112 to a candidate region, a specific region extraction unit 114 to extract a specific region from the candidate region separated at region separation unit 113, an image inclination detection unit 115 to detect inclination of image information subjected to a specific region extraction at specific region extraction region 114, an extraction area determination unit 116 to determine an extraction area from image information subjected to inclination detection at image inclination detection unit 115 and specific region extraction at specific region extraction unit 114, an image rotation unit 117 to rotate image information input from image input device 200 by an angle of rotation in accordance with the inclination detected by image inclination detection unit 115, and an image extracting unit 118 to cut the extraction area determined at extraction area determination unit 116 from rotated image information rotation by image rotation unit 117.

Image size reduction unit 111 reduces image information applied from image input device 200 and transmits the reduced image information to under color removal unit 112. Image information is reduced for the purpose of increasing the speed of subsequent image processing. Image size reduction unit 111 is dispensable in the case where increasing the speed of image processing is not required.

Under color removal unit 112 removes the under color present in the background region from the image information reduced at image size reduction unit 111 to provide image information having under color removed to region separation unit 113. This under color refers to lightly colored yellow generated when recycle paper or the like is scanned, or the pale under pattern color present in the background of an image. Under color removal of image information is conducted for the purpose of facilitating extraction of information such as text information, diagram information, picture information and the like. Under color removal is not required when the background of the image is uniform white. In this case, under color removal unit 112 is dispensable.

Region separation unit 113 separates a candidate region from image information subjected to under color removal at under color removal unit 113. The candidate region includes a text region, a diagram region, a picture region, a rule mark region, a margin region, and the like. The text region mainly includes text information. A diagram region, picture region, and rule mark region mainly include diagram information, picture information, and rule mark information, respectively.

A margin region refers to a region other than the diagram region, picture region, and rule mark region in the entire region of image information. Region separation unit 113 may be implemented to separate a candidate region from image information applied from image input device 200, or from image information reduced by image size reduction unit 111.

Specific region extraction unit 114 extracts a candidate region that satisfies a predetermined condition from the candidate regions separated by region separation unit 113 as a specific region. The predetermined condition is defined by the attribute of the candidate region. The attribute of a candidate region includes a text attribute, a graphic attribute, a picture attribute, and a rule mark attribute when the candidate region is a text region, a diagram region, a picture region, and a rule mark region, respectively. The predetermined condition may be one of these attributes, or a plurality of combinations of such attributes.

Image inclination detection unit 115 detects the inclination of image information from the image information subjected to a specific region extraction process by specific region extraction unit 114. Image inclination detection unit 115 may be implemented to detect inclination of image information applied from image input device 200, image information reduced at image size reduction unit 111, image information subjected to under color removal at under color removal unit 112, or image information subjected to a candidate region separation process by region separation unit 113.

Extraction area determination unit 116 determines an extraction area based on data of a specific region extracted by specific region extraction unit 114 and the inclination of image information detected at image inclination detection unit 115.

Image rotation unit 117 rotates image information applied from image input device 200 by an angle of rotation in accordance with the inclination of image information detected at image inclination detection unit 115. Image rotation unit 117 may also rotate image information reduced at image size reduction unit 111, image information subjected to under color removal at under color removal unit 112, image information subjected to a specific region separation process by region separation unit 113, or image information subjected to a specific region extraction process by specific region extraction unit 114.

Image extracting unit 118 extracts the extraction area determined by extraction area determination unit 116 from image information rotated by image rotation unit 117. Image extracting unit 118 provides the image information in the extraction area to external storage device 300 or image output device 400.

Figure 3:
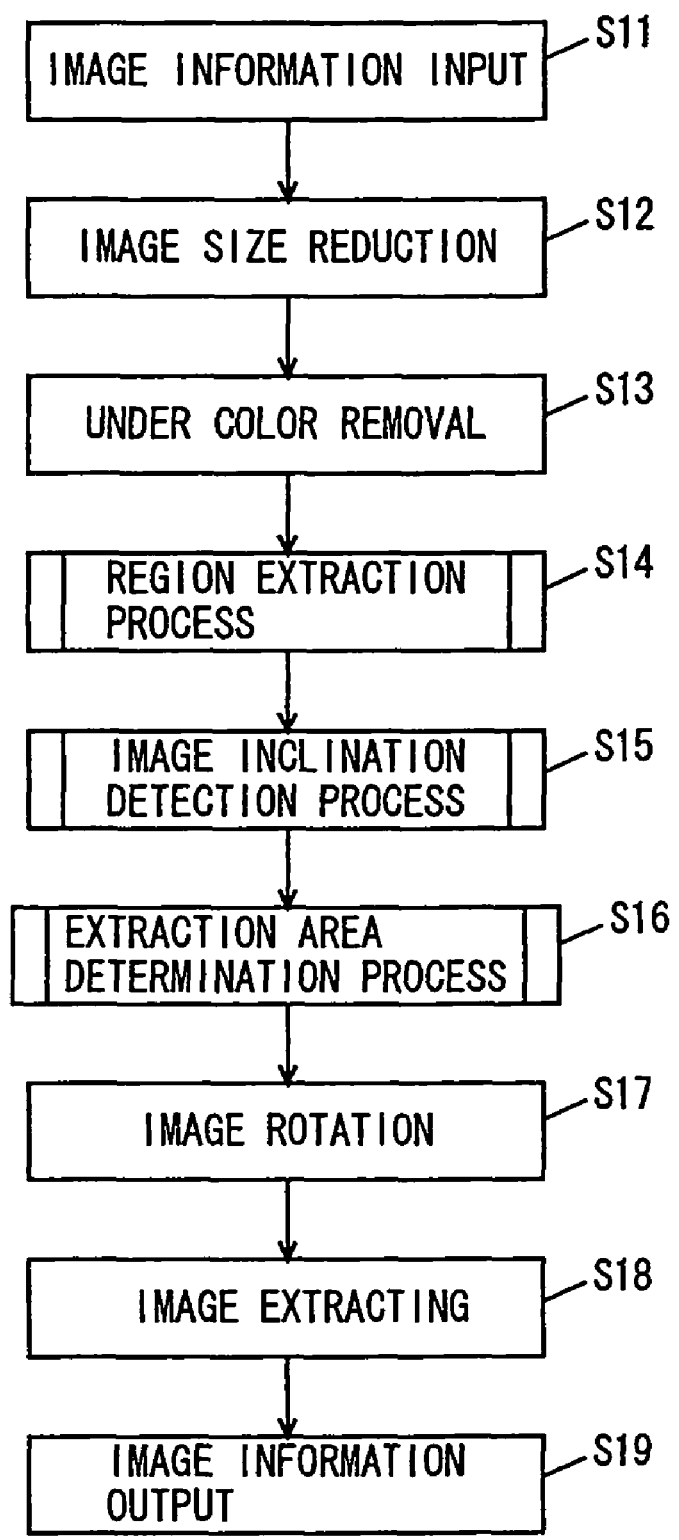
FIG. 3 is a flow chart of image processing carried out by the image processing apparatus of the first embodiment.

FIG. 3 shows a flow chart of image processing carried out by image processing apparatus 100 of the first embodiment. First, image information represented by respective color components of RGB (Red, Green, Blue) is entered from image input device 200 (step S11). The image information input at step S11 is subjected to a process of reducing the image size by image size reduction unit 111 (step S12). The image size can be reduced by, for example, employing the method of dividing image information into a plurality of rectangular regions, and replacing respective rectangular regions with the average density value. In this case, the size of a rectangular region is to be determined based on the resolution or the size of the image information. Specifically, a reduction process is preferably applied so that the length of the shorter side of the rectangle corresponds to approximately 500-1000 pixels. This reduction process is aimed to increase the speed of subsequent image processing. Therefore, step S12 may be executed selectively.

By under color removal unit 112, the image information reduced at step S12 is subjected to under color removal (step S13). One method of under color removal is, for example, enhancing the contrast of the image information and removing the highlight region. Step S13 may be executed selectively. The process of under color removal will be described afterwards with reference to FIGS. 4A and 4B.

Then, a region extraction process of extracting a specific region from image information subjected to under color removal at step S13 is executed (step S14). This region extraction process will be described afterwards with reference to FIG. 5.

An image inclination detection process of detecting inclination of image information from the image information subjected to a specific region extraction process at step S14 is executed (step S15). This image inclination detection process will be described afterwards with reference to FIG. 8.

Based on the specific region extracted at step S14 and the inclination of image information detected at step S15, the extraction area to be extracted from image information subjected to rotation, when image information is rotated, is determined (step S16). This extraction area determination process will be described afterwards with reference to FIG. 11.

The image information input at step S11 is rotated by an angle of rotation in accordance with the inclination of image information detected at step S15 (step S17). The extraction area determined at step S16 is extracted from rotated image information (step S18). Image information in the extraction area is output to external storage device 300 or image output device 400 (step S19).

The image rotation process executed at step S17 can be executed prior to the extraction area determination process of step S16.

FIGS. 4A and 4B are density histograms to describe the under color removal process carried out by image processing apparatus 100 of the first embodiment. The under color removal process is a process executed at step S13 in the image processing procedure of FIG. 3. FIG. 4A is a density histogram prior to an expansion process. FIG. 4B is a density histogram after an expansion process is applied.

First, a density histogram of respective RGB components of the image information is produced (FIG. 4A). A density conversion process of expanding in the largest value direction and smallest value direction in each histogram is carried out (FIG. 4B). In the case where the expanded result exceeds the largest value and smallest value of a predetermined density gradation, expanded data corresponding to that pixel will take the largest value or smallest value of the density gradation. By setting a larger amount of expansion in the largest value direction, a highlight region can be removed. Accordingly, under color removal is effected. Furthermore, instead of subjecting the entire image information to the same under color removal process, the image information can be divided into a plurality of rectangular regions, and carry out under color removal with a different amount of expansion for each rectangular region. Accordingly, under color removal process can be applied irrespective of the gray level of the background color or background pattern.

Figure 5:
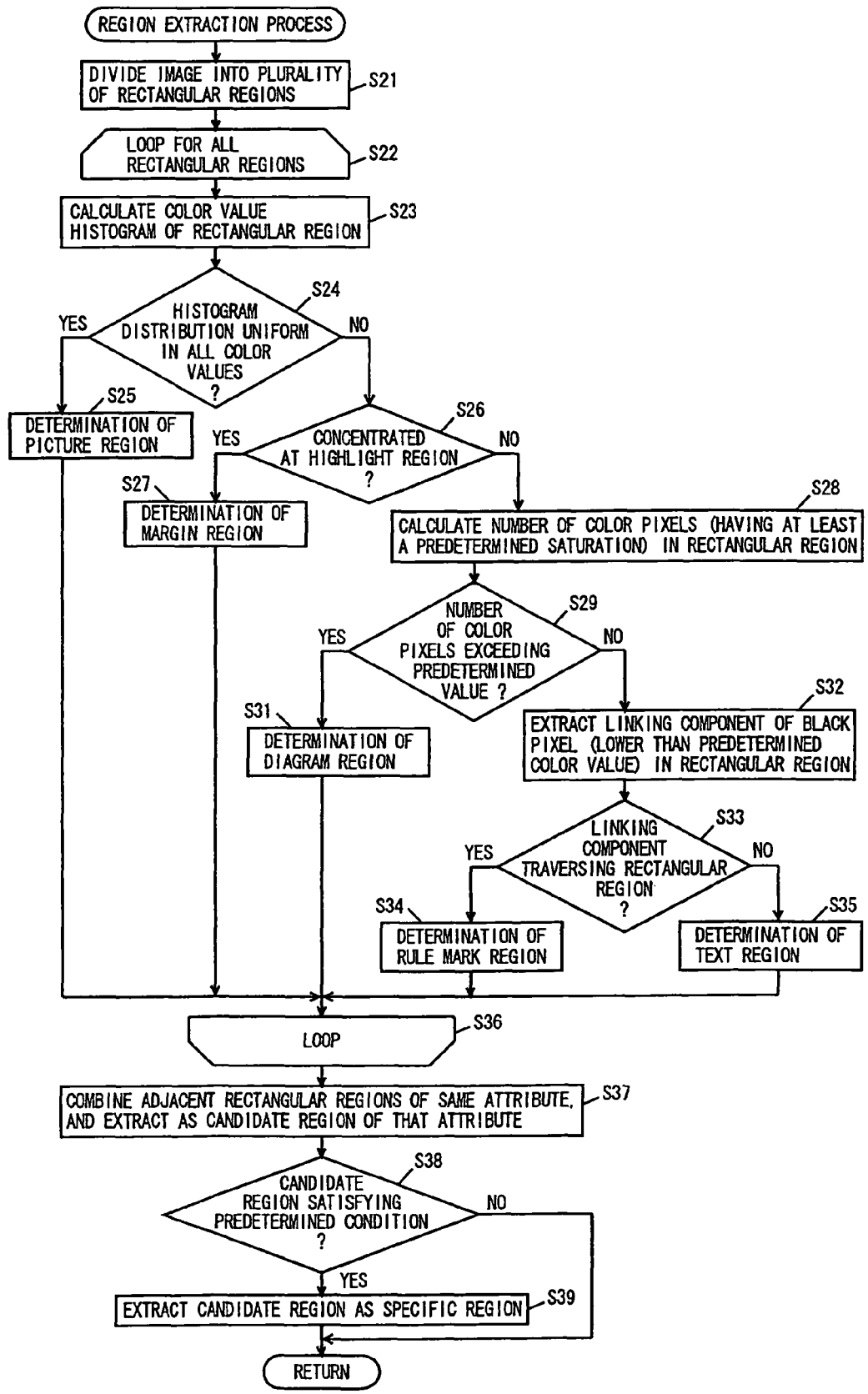
FIG. 5 is a flow chart of a region extraction process carried out by the image processing apparatus of the first embodiment.

FIG. 5 is a flow chart of a region extraction process carried out by image processing apparatus 100 of the first embodiment. The region extraction process is executed at step S14 in the image processing procedure of FIG. 3. Referring to FIG. 5, image information subjected to under color removal at step S13 is divided into a plurality of rectangular regions by region separation unit 113 (step S21).

Figures 6, 7:
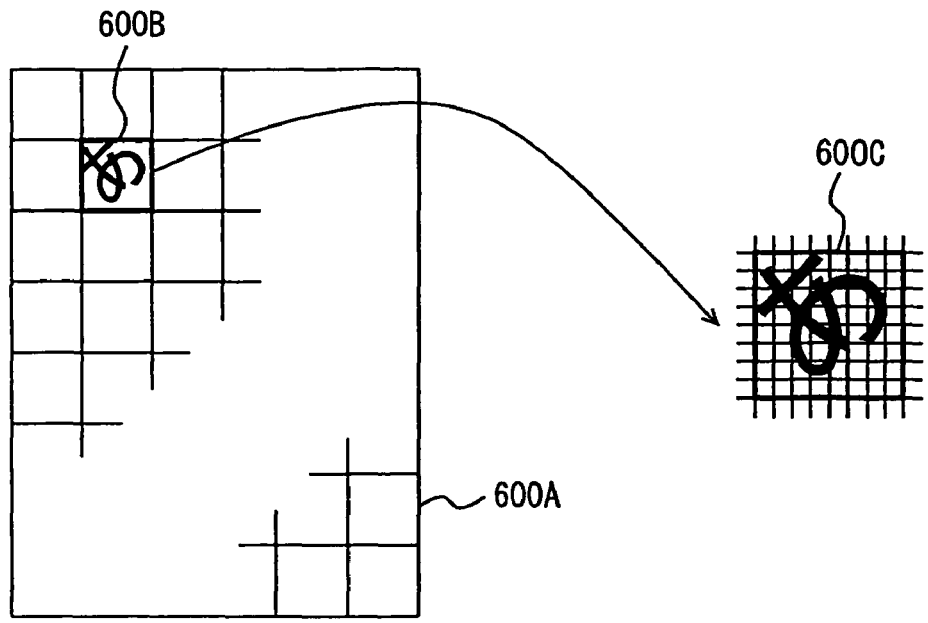
FIG. 6 shows an example of dividing image information into a plurality of regions in the region extraction process carried out by the image processing apparatus of the first embodiment.
FIG. 7 shows an example of a setting screen to set a condition to extract a specific region by the image processing apparatus of the first embodiment.

FIG. 6 shows an example of image information divided into a plurality of regions in the image extraction process carried out by image processing apparatus 100 of the first embodiment. Image information 600A is divided into a plurality of rectangular regions. A rectangular region 600C is an enlargement of one of divided rectangular regions 600B. In the present embodiment, each block of a rectangular region has the size of 8×8 pixels. The size of one block preferably corresponds to the size of substantially one character to facilitate discrimination between a text region and a rule mark region.

Returning to the flow chart of FIG. 5, the steps set forth below (step S22) are executed for each of all the rectangular regions divided at step S21. First, a color value histogram of the rectangular region is calculated (step S23). Then, determination is made whether the histogram distribution is uniform for all the color values (step S24). When uniform, determination is made that the rectangular region is a picture region, and control proceeds to step S36 (step S25). When not uniform, control proceeds to step S26.

Determination is made whether the histogram distribution is concentrated at the highlight region (step S26). When concentrated at the highlight region, determination is made that the rectangular region is a margin region, and control proceeds to step S36 (step S27). Determination of whether the histogram distribution is concentrated at a highlight region or not is based on, for example, whether the highlight region is concentrated at a region with a color value of at least 230 in the case where the color value is set in the range of 0-255. When the distribution is not concentrated at a highlight region, control proceeds to step S28. At step S28, the number of color pixels included in the rectangular region is calculated. A color pixel is a pixel whose chroma component exceeds a predetermined value. When the number of color pixels includes in the rectangular region is equal to or exceeds a predetermined value, determination is made that the rectangular region is a diagram region (step S31), and control proceeds to step S36. When the number of color pixels included in the rectangular region is below the predetermined value, control proceeds to step S32.

Then, a linking component of pixels other than white pixels included in the rectangular region is extracted (step S32). Determination is made whether the linking component transverses the rectangular region (step S33). A linking component is a group of pixels other than white pixels, adjacent to each other. As an alternative to the process of extracting a linking component of pixels excluding white pixels, a process of extracting a linking component of pixels whose color value component is below a predetermined value may be carried out. Also, a linking component formed of only black pixels, (a pixel whose color value is 0) may be extracted. Determination is made that the rectangular region is a rule mark region when the linking component transverses the rectangular region. In this context, control proceeds to step S36 (step S34). In the case where a linking component does not transverse the rectangular region, determination is made that the rectangular region is a text region, and control proceeds to step S36 (step S35).

The processes of steps S22-S35 are repeated for all the rectangular regions (step S36). Each rectangular region is separated into regions of respective attributes. Then, adjacent rectangular regions having the same attribute are combined. The combined rectangular regions are extracted as a candidate region of that attribute (step S37). When the majority of eight rectangular regions $A_1$-$A_8$ adjacent in eight directions located vertically, horizontally and obliquely with respect to a certain rectangular region $A_0$ has the same attribute b, the attribute of rectangular region $A_0$ surrounded by the eight rectangular regions $A_1$-$A_8$ having an attribute $b_0$, not of attribute b, may be regarded as having attribute b.

Finally, determination is made whether the candidate region extracted at step S37 satisfies a predetermined condition or not by specific region extraction unit 114 (step S38). When a predetermined condition is satisfied, the candidate region is extracted as a specific region (step S39). Step S38 and step S39 constitute a specific region extraction process. Then, control returns to step S14 of the image processing procedure of FIG. 3. A predetermined condition may be the relative position of the candidate region with respect to the image area of the image information, or a condition defined by the attribute of the candidate region. The predetermined condition may be set in advance, or specified by the operator at every input of image information. The way operator specifies that a candidate region is important or not will be described afterwards with reference to FIG. 7. The event of a predetermined condition being defined by the relative position of the candidate region with respect to the image area of image information will be described afterwards with reference to a modification of the first embodiment. For example, if the input image information corresponds to image information including the text information, diagram information, picture information, and rule mark information, the predetermined condition is to be set on the candidate region being a region including information other than a margin region, i.e., the candidate region being a text region, diagram region, photograph region, and rule mark region, or set on the candidate region being a region excluding a region including an important information from the image information, i.e., the candidate region being a text region, diagram region, and a picture region. In the case where importance is placed only on numerics and characters such as data of experiments, the predetermined condition is set on the candidate region being a text region.

In the case where image information input from image input device 100 is image information of gray scale instead of image information including RGB components, the processes of steps S28 and S29 are dispensable. In this case, a diagram region and a rule mark region are regarded as a region of the same attribute.

FIG. 7 shows an example of a setting screen to set the condition of extracting a specific region by image processing apparatus 100 of the first embodiment. The setting screen includes a plurality of buttons through GUI (Graphical User Interface) to set the condition of extracting a specific region. By specifying any of the plurality of buttons, the attribute corresponding to the depressed button is set as the condition of extracting a specific region from the candidate regions. The setting screen includes a "text/picture" button to set a text region and a picture region as the condition of extracting a specific region, a "text/diagram" button to set the condition of extracting a text region and a diagram region as a specific region, a "text/rule mark" button to set the condition of extracting a text region and a rule mark region as a specific region, a "text" button to set the condition of extracting a text region as a specific region, a "picture" button to set the condition of extracting a picture region as a specific region, a "diagram" button to set the condition of extracting a diagram region as a specific region, and a "rule mark" button to set the condition of extracting a rule mark region as a specific region. Buttons to set another attribute or a button to set a combination of a plurality of attributes may be included in addition to the aforementioned buttons.

Figure 8:
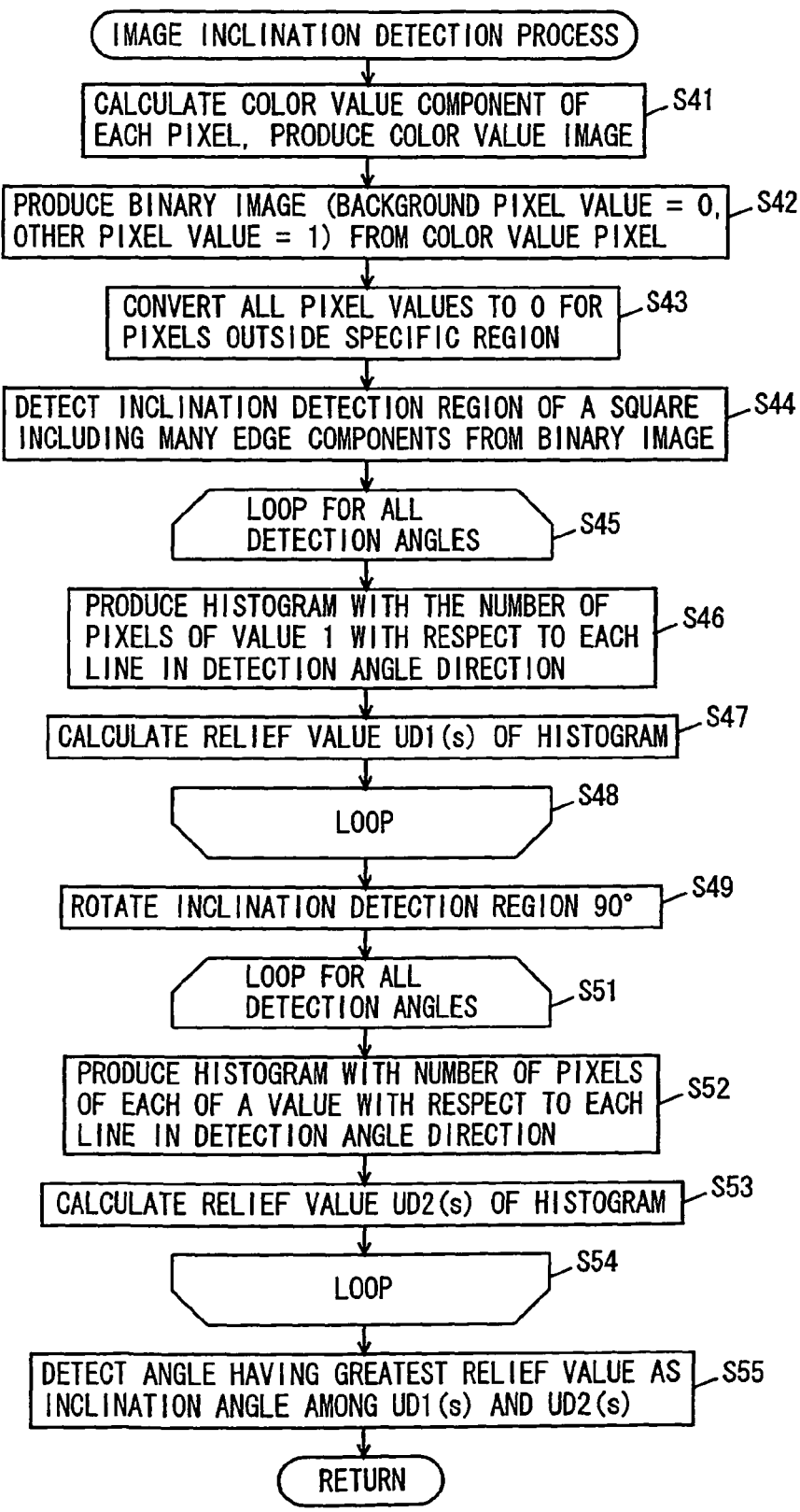
FIG. 8 is a flow chart of an image inclination detection process carried out by the image processing apparatus of the first embodiment.

FIG. 8 is a flow chart of the image inclination detection process carried out by image processing apparatus 100 of the first embodiment. The image inclination detection process is executed at step S15 in the image processing procedure of FIG. 3.

Referring to FIG. 8, the color value component of each pixel in the image information is calculated to produce a color value image by image inclination detection unit 115 (S41). A binarization process is applied on the produced color value image based on a predetermined threshold value to produce a binary image (step S42). An example of a method of obtaining a threshold value includes the steps of obtaining the edge component from image information using a Sobel filter that is a general edge detection filter, obtaining the average of the color values corresponding to all the edge pixels, and setting the obtained average value as the threshold value. This method takes the advantage that there is a high possibility of a color value to be used as the threshold value in binarization being present at the boundary region of a character or a graphic.

Pixels other than the specific region have the pixel value converted to 0 in the binarization image generated at step S42 (step S43). A square region including the greatest edge components in the binary image converted at step S43 is detected as an inclination detection region (step S44).

Figure 9:
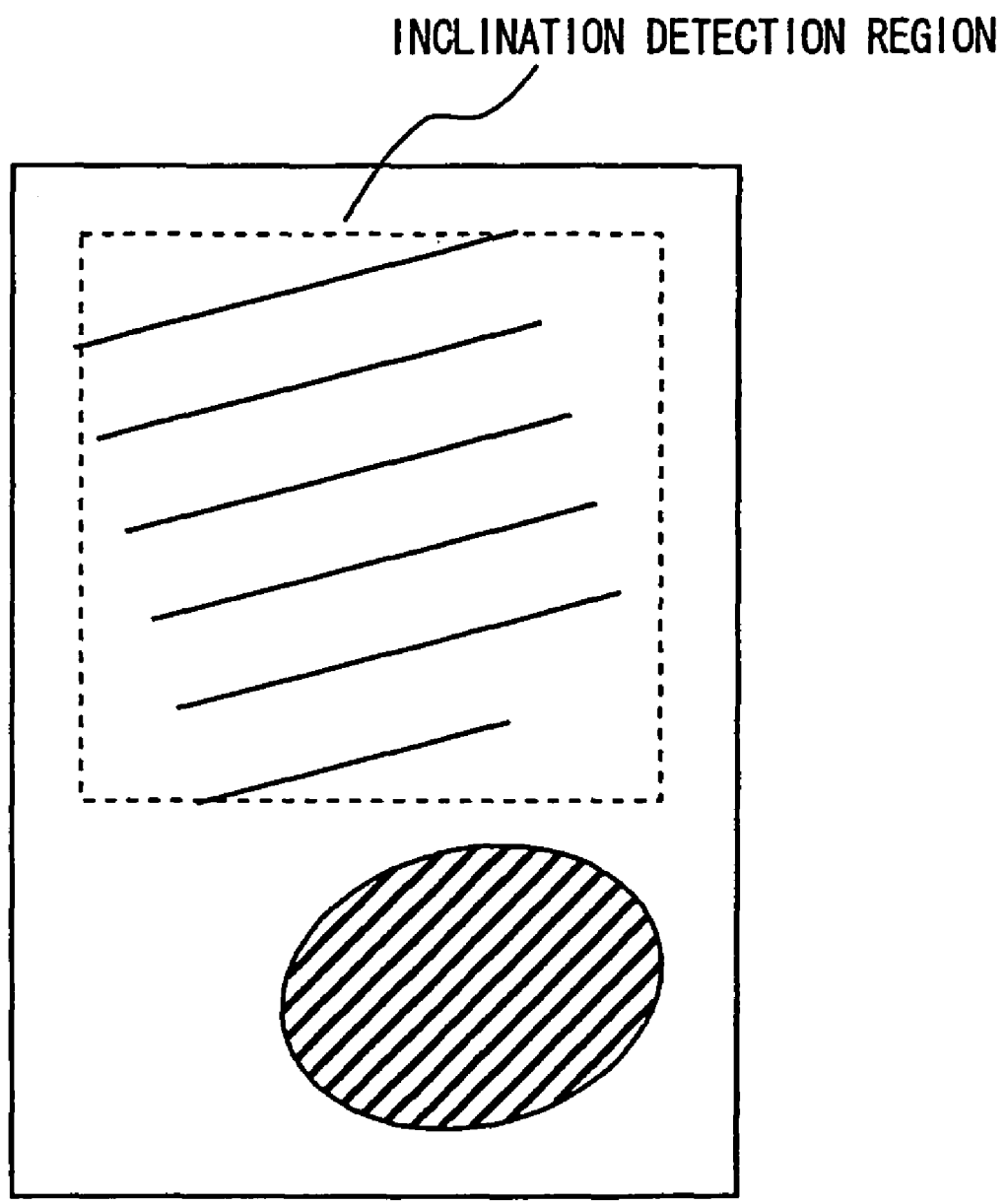
FIG. 9 shows an example of a process of detecting an inclination detection region including many edge components from a binary image.

FIG. 9 shows an example of the process of detecting an inclination detection region with the greatest edge components from a binary image. Referring to FIG. 9, a square region including the greatest edge components in the binary image generated at step S42 in the image inclination detection process described with reference to FIG. 8 is detected as an inclination detection region. A region represented by a character generally includes relatively many edge components. Therefore, when a region represented by a character is included in image information, the region represented with a character is detected as an inclination detection region. Furthermore, by using a square region for the inclination detection region, an image inclination detection process can be effected for both a vertical-writing manuscript as well as a horizontal-writing manuscript based on the same inclination detection criterion by just rotating the square region 90°. The inclination detection region preferably has a size of approximately 500×500 pixels.

Referring to FIG. 8 again, the loop of steps S45-S48 is executed for all detection angles at inclination angle detection unit 115 (step S45). A detection angle is the angle with respect to an inclination detection region when a cumulative histogram that will be described afterwards is to be produced. For example, there are 91 detection angles with the step of 1° in the range of −45° to 45°. The loop of steps S45-S48 is executed for all the 91 detection angles. The number of pixels having the value of 1 is counted for each line in the detection angle direction in the inclination detection region. A cumulative histogram for the detection angle is generated (step S46). A relief degree $UD1(s)$ of the cumulative histogram is calculated according to equation (1) (step S47).

$$UD(s) = \sum_i |f(i) - f(i+1)| \quad (1)$$

Here, s represents the detection angle. Then, the loop of steps S45-S48 is repeated (step S48).

Figure 10B:
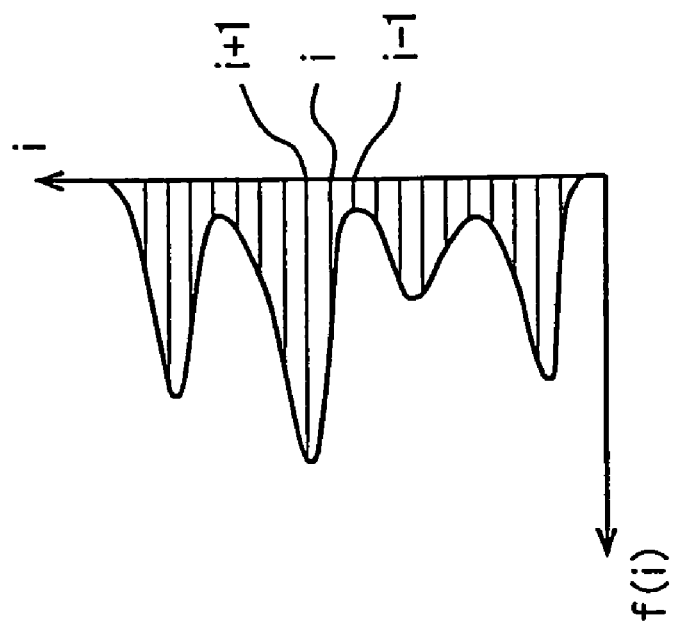
FIGS. 10A and 10B are cumulative histograms representing the number of pixels whose value of the detection angle direction for each line is 1.
Figure 10A:
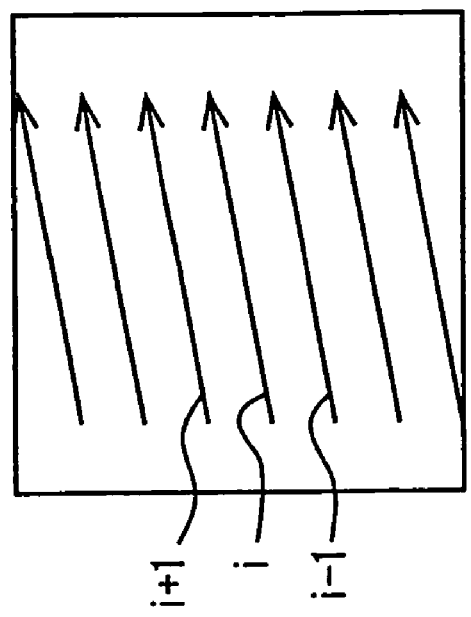

FIGS. 10A and 10B are cumulative histograms indicating the number of pixels whose value is 1 with respect to each line in the detection angle direction. FIG. 10A schematically shows an example of an inclination detection region. The arrows in FIG. 10A represents respective lines of the detection angle direction. This line refers to a line of one pixel width transversing the inclination detection region.

FIG. 10B shows an example of a cumulative histogram with respect to an inclination detection region. Referring to FIG. 10B, the cumulative histogram represents the frequency f (i) of pixels having a value of 1 present in each line (the i-th line) for all the lines in the inclination detection region. The relief value $UD1(s)$ of the cumulative histogram is calculated by the above equation (1) using f (i).

Returning to FIG. 8, the inclination detection region is rotated 90° (step S49). A process similar to steps S45-S48 is executed at steps S51-S54. A relief value $UD2(s)$ for each detection angle s is calculated according to equation (1).

Finally, the detection angle s corresponding to the highest relief degree among relief values $UD1(s)$ and $UD2(s)$ calculated by the process of steps S45-S48 and steps S51-S54 is detected as the inclination of image information (step S55). Then, control returns to step S15 of the image processing procedure of FIG. 3.

Figure 11:
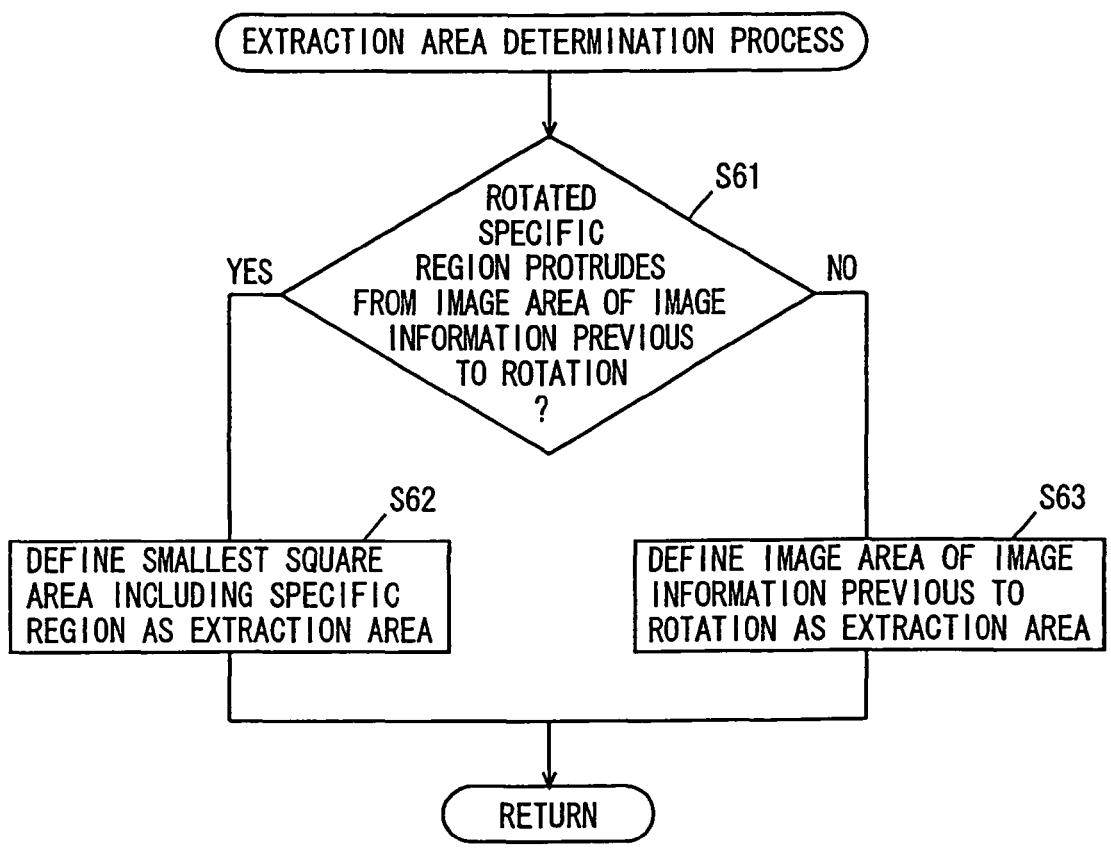
FIG. 11 is a flow chart of an extraction area determination process carried out by the image processing apparatus of the first embodiment.

FIG. 11 is a flow chart of an extraction area determination process carried out by image processing apparatus 100 of the first embodiment. The extraction area determination process is executed at step S16 in the image processing procedure of FIG. 3. Referring to FIG. 11, the specific region extracted at step S14 of FIG. 3 is rotated about the centroid of image information by extraction area determination unit 116, based on the inclination of image information detected at step S15 of FIG. 3. Detection is made whether the rotated specific regions subjected to rotation protrudes from the image area of image information previous to rotation (step S61). When detection is made that the specific region protrudes, control proceeds to step S62, otherwise, to step S63.

Specifically, the coordinates of the contour of the rotated specific region are calculated, and determination is made whether the rotated coordinates of the contour protrudes from the image area of image information previous to rotation. This process is directed to minimizing the number of pixels to be processed to allow high speed processing. Alternatively, the smallest rectangular area surrounding the specific region may be obtained in advance to calculate the rotated coordinates of the four corners of that smallest rectangular area, and determination is made whether the rotated coordinates of the four corners of the smallest rectangular area protrudes from the image area of image information previous to rotation. Also, the rotated coordinates can be calculated for all pixels in the specific region to determine whether the rotated coordinates of all pixels in the specific region protrudes from the image area of the image information previous to rotation or not.

When detection is made that the specific region protrudes, the smallest rectangular region including the specific region rotated at step S61 is defined as the extraction area (step S62). Then, control proceeds to step S16 of the image process described with reference to FIG. 3.

When detection is made that the specific region does not protrude, the image area of the image information previous to rotation is determined as the extraction area (step S63). Then, control returns to step S16 of the image processing procedure described with reference to FIG. 3.

Figure 12B:
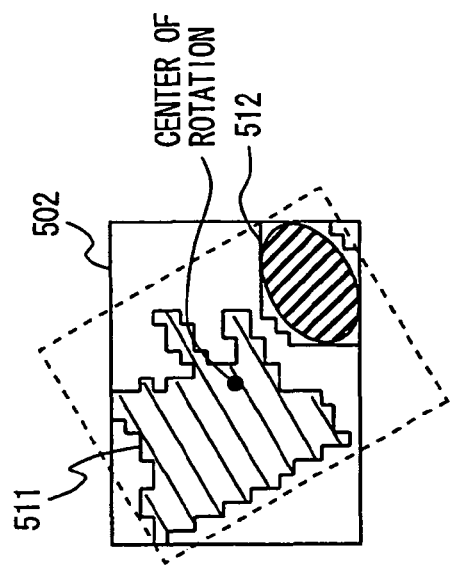
FIGS. 12A-12D are diagrams to describe image processing carried out by the image processing apparatus of the first embodiment.
Figure 12D:
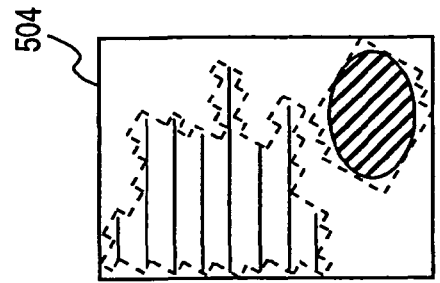
Figure 12A:
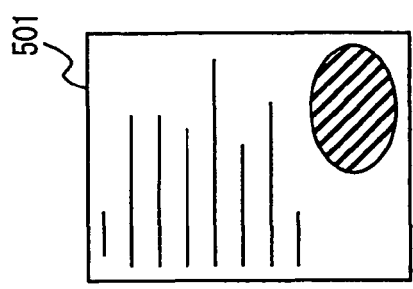

FIGS. 12A-12D are diagrams to describe image processing carried out by image processing apparatus 100 of the first embodiment. FIG. 12A shows a document 501. Document 501 includes text information and diagram information. Document 501 is input as image information by image input device 200 and applied to image processing apparatus 100. The case where document 501 is input with document 501 in an inclined state will be described hereinafter.

FIG. 12B corresponds to image information 502 previous to rotation. Image information 502 previous to rotation is input into image processing apparatus 100 as image information of the smallest rectangular area including text information and diagram information. Then, specific regions 511 and 512 are extracted from image information 502 previous to rotation. Inclination of image information is detected. Since image information includes text information and diagram information, the text region and the diagram region are extracted as specific regions when the condition of extracting text region 512 and diagram region 512 as specific regions is set.

Figure 12C:
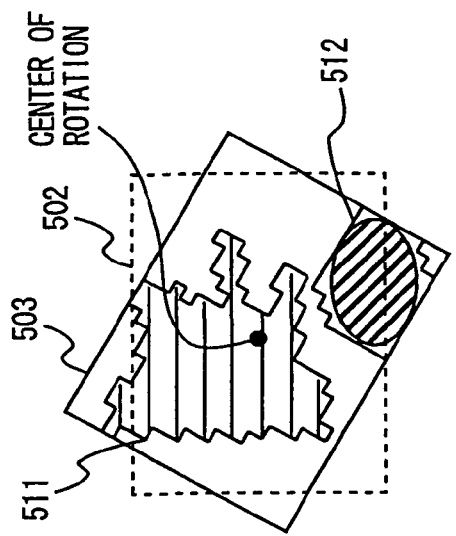

FIG. 12C shows rotated image information 503 subjected to rotation. Referring to FIG. 12C, when image information 502 previous to rotation is rotated by an angle of rotation corresponding to the inclination detected at FIG. 12B, determination is made whether the specific region of rotated image information 503 protrudes from the image area of image information 502 previous to rotation. Here, protrusion of a specific region of rotated image information 503 from the image area of image information 502 previous to rotation is detected.

FIG. 12D shows extracted image information 504. Since detection is made of protrusion in FIG. 12C, the extraction area of the smallest area including specific regions 511 and 512 of rotated image information 503 is determined. This area is extracted as extracted image information 504. The image area of extraction image information 504 is rectangular.

In the case where a specific region of rotated image information 503 protrudes from the image area of image information 502 previous to rotation, a smallest rectangular area including a specific region of rotated image information 503 is extracted from rotated image information. Therefore, loosing information from the image information subjected to rotation correction can be prevented. Also, the amount of data of image information subjected to rotation correction can be minimized.

When the specific region of rotated image information does not protrude from the image area of image information previous to rotation in image processing apparatus 100 of the first embodiment, the image area of image information previous to rotation is extracted from rotated image information. Therefore, an image having a size identical to that of the input image information can be output.

In image processing apparatus 100 of the first embodiment, a region of a predetermined attribute or an attribute specified by an operator is extracted. Therefore, loosing information of a certain attribute from image information subjected to rotation correction can be prevented.

The above description of the first embodiment is based on processing carried out by image processing apparatus 100. The present invention can be taken as image processing method executing the process of FIG. 3, an image processing program to cause a computer to execute the process of FIG. 3, and a computer readable recording medium recorded with an image processing program.

Modification of a First Embodiment

In the first embodiment, a specific region is extracted in accordance with the attribute of the region when a specific region is to be extracted by specific region extraction unit 114 of image processing apparatus 100. As a modification of the first embodiment, the condition of extracting a specific region by specific region extraction unit 114 is set as a condition defined by the relative position of a candidate region with respect to the image area of image information.

This modification of the first embodiment corresponds to an improvement of the specific region extraction process carried out at steps S38 and S39 of the region extraction process described with reference to FIG. 5.

Figure 13A:
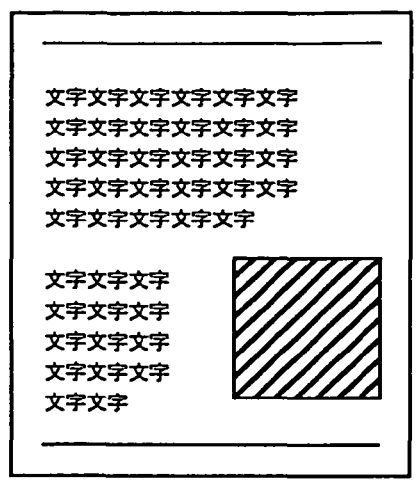
FIGS. 13A-13D are diagrams to describe a specific region extraction process carried out by a modification of the image processing apparatus of the first embodiment.

FIGS. 13A-13D are diagrams to describe a specific region extraction process carried out by a modification of the image processing apparatus 100 of the first embodiment. FIG. 13A represents input image information. The input image information includes text information, diagram information, and rule mark information. Rule mark information is located in the proximity of the upper and lower ends of the image information.

Figure 13B:
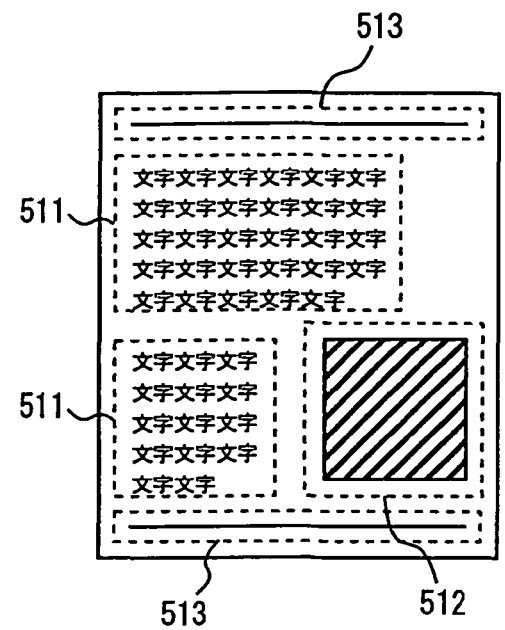

FIG. 13B represents an extracted candidate region. A document is input as image information from image input device 200 to image processing apparatus 100. The region including text information, diagram information, and rule mark information are extracted as a text region 511, a diagram region 512, and a rule mark region 513, respectively.

Figure 13C:
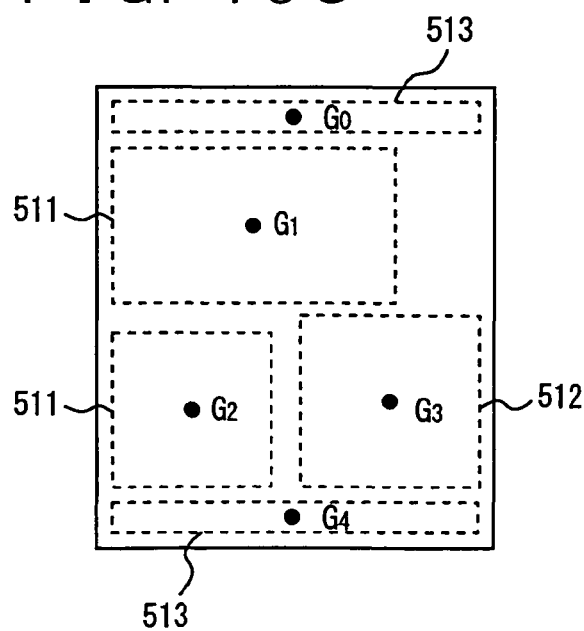

FIG. 13C represents the centroids of the candidate regions. Centroids $G_1$ and $G_2$ of text region 511, centroid $G_3$ of diagram region 512, and centroids $G_0$, $G_4$ of rule mark region 513 are obtained.

Figure 13D:
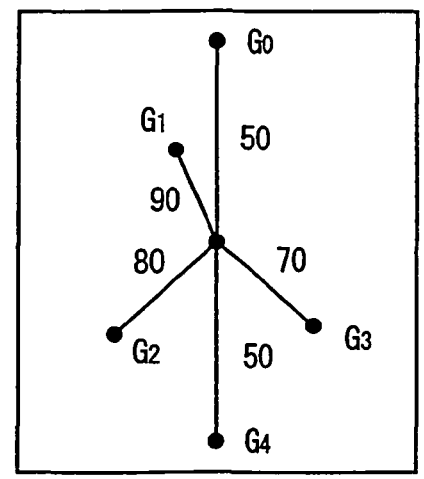

FIG. 13D represents the relative position between the centroid of image information and the centroid of candidate regions. The evaluation value of each candidate region is calculated based on the relative position of a candidate region with respect to the image area of image information. Specifically, the evaluation value of each candidate region is calculated in accordance with the relative position of the centroid of a candidate region with respect to the centroid of the image area of the image information.

Figure 14:
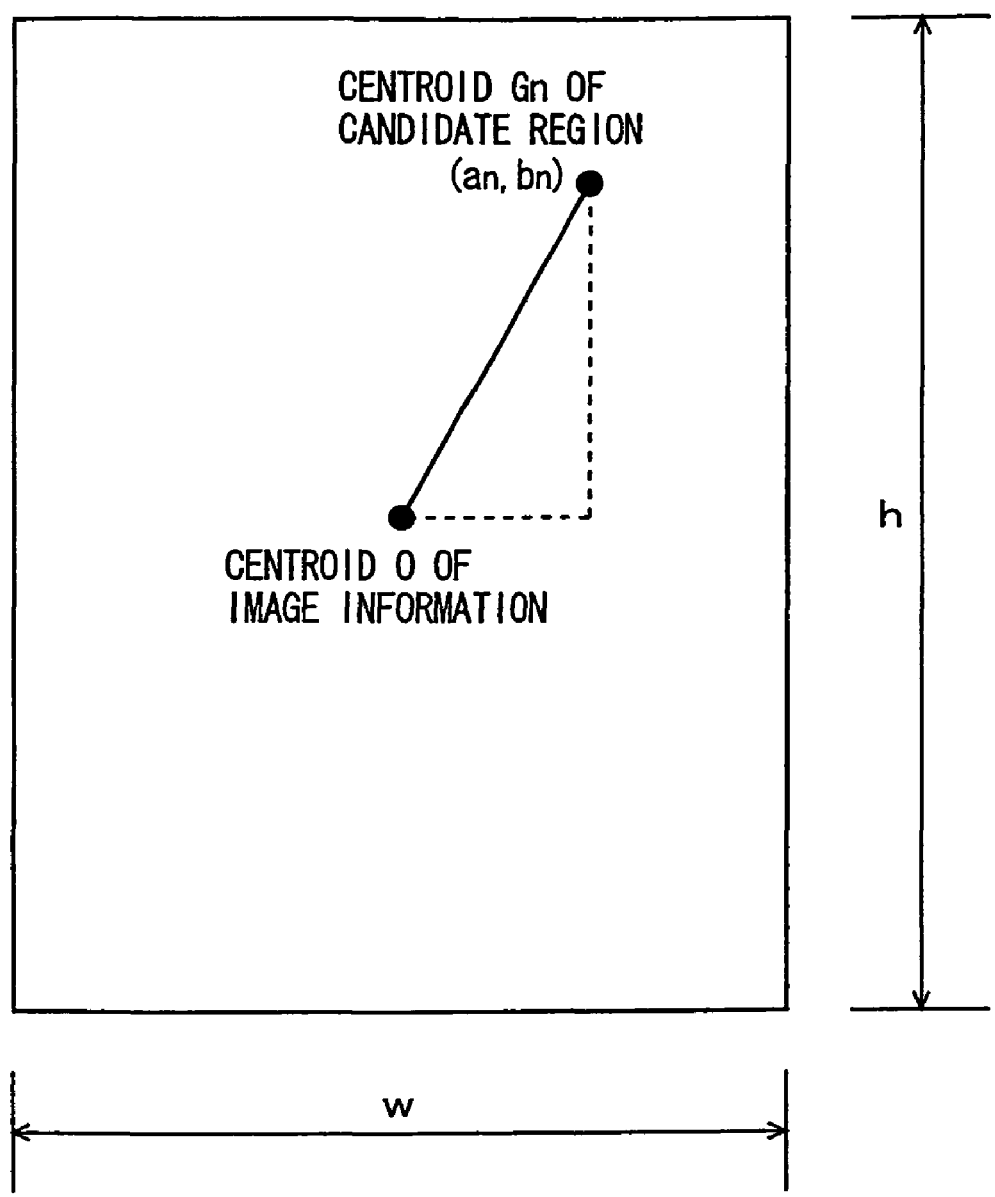
FIG. 14 represents a relative position of a candidate region with respect to image information.

FIG. 14 represents the relative position of a candidate region with respect to image information. When the centroid O of the image area of the image information is taken as the origin, the coordinates of centroid $G_n$ of the candidate region can be represented as $(a_n, b_n)$. The length of the image area of image information in the horizontal direction and the vertical direction is set as "w" and "h", respectively. An evaluation value $P_n$ of the current candidate region can be calculated by, for example, equation (2).

$$P_n = \frac{100(w - 2|a_n|)(h - 2|b_n|)}{wh} \quad (2)$$

By equation (2), evaluation value $P_n$ becomes higher as the relative position of centroid $G_n$ of the candidate region with respect to centroid O of the image area of the image information becomes closer. When centroid $G_n$ of the candidate region overlaps with centroid O of the image area of the image information, evaluation value $P_n=100$ is established. In the case where centroid $G_n$ of the candidate region is located at the farthest edge of the image area of image information, evaluation value $P_n=0$ is established. In other words, evaluation value $P_n$ is proportional to absolute value $|a_n|$ of the x coordinate and the absolute value $|b_n|$ of the y coordinate value of centroid $G_n$ of the candidate region.

Calculation of evaluation value $P_n$ of a candidate region is not restricted to equation (2) set forth above. Any method that allows calculation of evaluation value $P_n$ by the relative position of a candidate region with respect to the image area of the image information can be used. For example, the following equation (3) can be used.

$$P_n = (w - 2|a_n|)(h - 2|b_n|) \quad (3)$$

By equation (3), evaluation value $P_n = wh$ is established when centroid $G_n$ of the candidate region overlaps with centroid O of the image area of the image information. When centroid $G_n$ of the candidate region is located at the farthest end of the image area of the image information, evaluation value $P_n=0$ is established.

Evaluation value $P_n$ calculated by equation (2) or (3) attains a higher value as a function of centroid $G_n$ of the candidate region approaching centroid O of the image area of the image information. Therefore, a candidate region located close to the centroid of the image area of the image information will be extracted as a specific region by setting the condition of an evaluation value $P_n$ attaining at least a certain value.

Evaluation value $P_n$ calculated by equation (2) or (3) takes a higher value as centroid $G_n$ of the candidate region approaches centroid O of the image area of the image information. Alternatively, calculation may be employed in which evaluation value $P_n$ takes a smaller value as centroid $G_n$ of the candidate region approaches centroid O of the image area of the image information. In this case, the candidate region located close to the centroid of the image area of the image information will be extracted as the specific region by setting the predetermined condition to a condition that evaluation value $P_n$ is below a certain value. Furthermore, another evaluation value may be employed as long as it is an evaluation value of a candidate region exhibiting monotone increase or monotone decrease in correlation to the relative position of a candidate region with respect to the image area of the image information.

Referring to FIG. 13D, it is assumed that the evaluation values of centroids $G_0$-$G_4$ of each candidate region has been calculated as $P_0=50$, $P_1=90$, $P_2=80$, $P_3=70$, $P_4=50$, respectively, by equation (2).

In the case where the predetermined condition is preset with evaluation value $P_n$ exceeding the threshold value of 60, the two rule mark regions 513 corresponding to evaluation values $P_0$ and $P_4$ are not extracted as specific regions. The two text regions 511 and diagram region 512 corresponding to evaluation values $P_1$, $P_2$ and $P_3$ are extracted as specific regions.

The predetermined condition may be a condition defined by the relative position of a candidate region with respect to the image area of image information and an attribute of the candidate region. For example, by multiplying evaluation value $P_n$ calculated from the relative position of a candidate region with respect to image information by a factor K corresponding to the attribute of the candidate region, i.e., $P_n'=K \times P_n$, a candidate region having an evaluation value $P_n'$ exceeding a predetermined threshold value can be extracted as a specific region. Specifically, when the factor K for a text region, a diagram region, a picture region, a rule mark region, and a margin region is set as $K_1=1.0$, $K_2=0.8$, $K_2=0.8$, $K_4=0.6$, and $K_5=0$, respectively, evaluation value $P_n'$ is established as $P_0'=50 \times K_4=30$, $P_1'=90 \times K_1=90$, $P_2'=80 \times K_1=80$, $P_3'=70 \times K_2=56$, and $P_4'=50 \times K_4=30$, respectively. Therefore, under the predetermined condition of evaluation value $P_n'$ calculated from the relative position of a candidate region with respect to image information exceeding the threshold value of 50, for example, the two text regions 511 and diagram region 512 corresponding to evaluation values $P_1'$, $P_2'$, $P_3'$ are extracted as the specific region.

The predetermined condition may be a condition defined by the size of the candidate region. In this case, an evaluation value of a candidate region is calculated based on the size of the candidate region, and a specific region is extracted in accordance with the evaluation value. More specifically, an evaluation value of a candidate region exhibiting monotone increase or monotone decrease in correlation with the size of a candidate region is calculated, and a candidate region whose evaluation value satisfies the predetermined condition is extracted as the specific region.

The predetermined condition may be a condition defined by the attribute and size of a candidate region, defined by the size of a candidate region and the relative position of a candidate region with respect to image area of image information, or defined by the attribute and size of a candidate region, and the relative position of a candidate region with respect to an image area of image information.

Figure 15A:
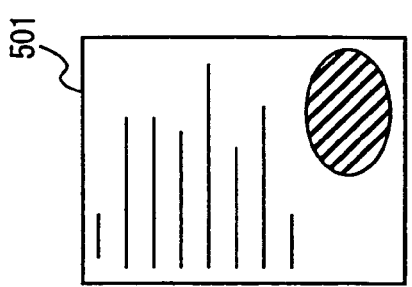
FIGS. 15A-15D are diagrams to describe image processing carried out by a modification of the image processing apparatus of the first embodiment.

FIGS. 15A-15D are diagrams to describe image processing carried out by image processing apparatus 100 according to a modification of the first embodiment. FIG. 15A represents a document 501. Document 501 includes text information and diagram information. Document 501 is read in as image information through image input device 200 to be applied to image processing apparatus 100. Description is based on the case where document 501 is applied in an inclined state.

Figure 15B:
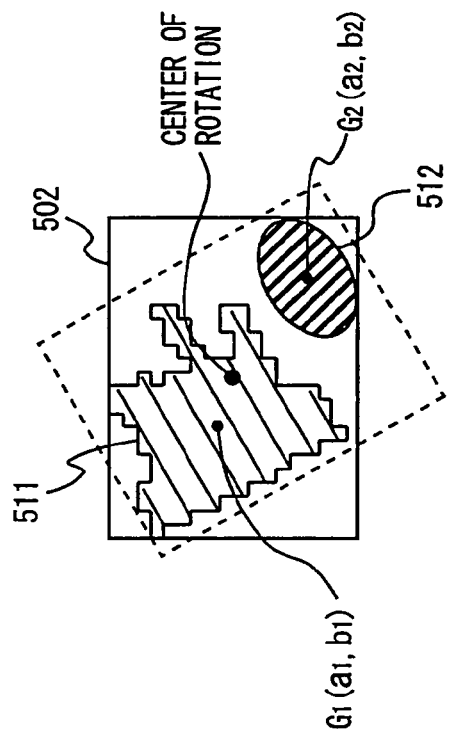

FIG. 15B represents image information 502 previous to rotation. Image information 502 previous to rotation is input to image processing apparatus 100 as image information of the smallest rectangular area including test information and diagram information. A text region 511 and a diagram region 512 are extracted as candidate regions from image information 502 previous to rotation, and inclination of the image information is detected. Then, centroid $G_1$ ($a_1$, $b_1$) of text region 511, and centroid $G_2$ ($a_2$, $b_2$) of diagram region 512 are obtained. Evaluation values $P_1$ and $P_2$ for respective centroids are calculated. In the present specification, it is assumed that evaluation value $P_1$ exceeds a predetermined value, and evaluation value $P_2$ does not exceed the predetermined value. Accordingly, text region 511 is extracted as a specific region whereas diagram region 512 is not extracted as a specific region.

Figure 15C:
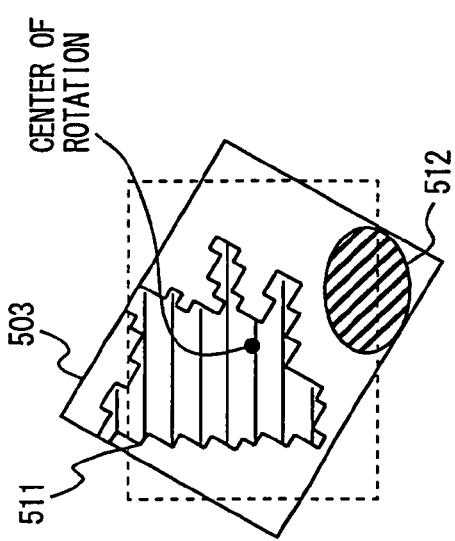

FIG. 15C represents rotated image information 503. When image information 502 previous to rotation is rotated by the angle of rotation corresponding to the detected inclination of FIG. 15B, detection is made whether text region 511 extracted as a specific region protrudes from the image area of image information 502 previous to rotation. In this case, text region 511 protrudes from the image area of image information 502 previous to rotation.

Figure 15D:
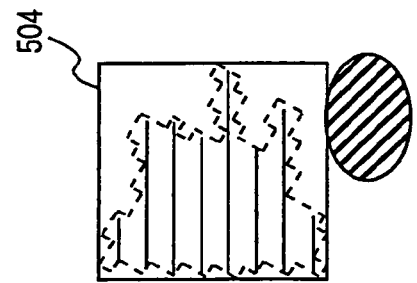

FIG. 15D represents extracted image information 504. Based on the detection of protruding at FIG. 15D, the smallest rectangular area including text region 511 extracted as a specific region is defined as the extraction area. The extraction area is extracted as extracted image information 504.

In the modification of the first embodiment, the relative position of a candidate region is obtained with the centroid of the image area of the image information as the reference point. The reference point is not limited to a centroid, and an arbitrary reference point can be defined as long as it is located in the image area of image information.

In image processing apparatus 100 according to a modification of the first embodiment, a plurality of candidate regions that are candidates of a specific region are extracted from the input image information, and an appropriate candidate region is extracted as a specific region from the plurality of candidate regions based on the relative position of the candidate region with respect to the image area of the image information. As a result, the event of loosing information present at a specific relative position with respect to the image area of the image information from the image information subjected to rotational correction can be prevented.

Second Embodiment

In the previous first embodiment, extraction area determination unit 116 of image processing apparatus 100 determines an extraction area so as to include a specific region. In the second embodiment, an extraction area determination unit 116A of an image processing apparatus 100A determines an extraction area so that the relative position with respect to a specific region satisfies a predetermined condition.

The structure of an image processing apparatus of the second embodiment is similar to that of the first embodiment described with reference to FIG. 1. Therefore, description thereof will not be repeated.

Figure 16:
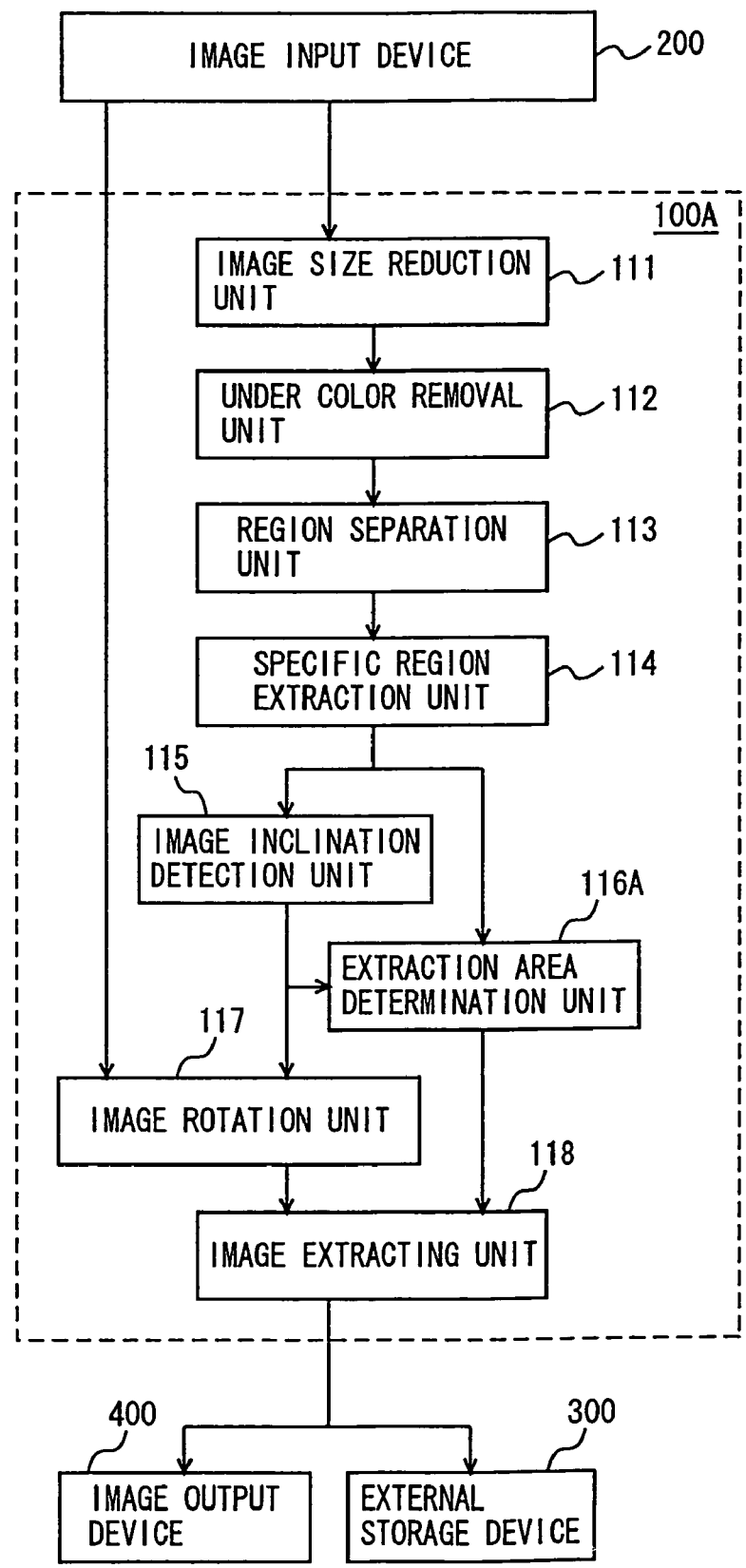
FIG. 16 is a functional block diagram of an image processing apparatus according to a second embodiment.

FIG. 16 is a functional block diagram of an image processing apparatus 100A Image processing apparatus 100A includes an image size reduction unit 111, an under color removal unit 112, a region separation unit 113, a specific region extraction unit 114, an image inclination detection unit 115, an extraction area determination unit 116A, an image rotation unit 117, and an image extracting unit 118.

Image size reduction unit 111, under color removal unit 112, region separation unit 113, specific region extraction unit 114, image inclination detection unit 115, image rotation unit 117 and image extracting unit 118 are similar to those of image processing apparatus 100 of the first embodiment described with reference to FIG. 2. Therefore, description thereof is not repeated.

An extraction area determination unit 116A assigns a score to a plurality of candidate areas having the same direction and size as the image area of image information previous to rotation, based on the relative position with respect to a rotated specific region in accordance with the inclination detected by image inclination detection unit 115 of a specific region extracted by specific region extraction unit 114. The candidate area exhibiting the best score is identified as the extraction area among the plurality of candidate areas assigned with scores. Determining an extraction area is equal to determining the position of an extraction area.

Figure 17:
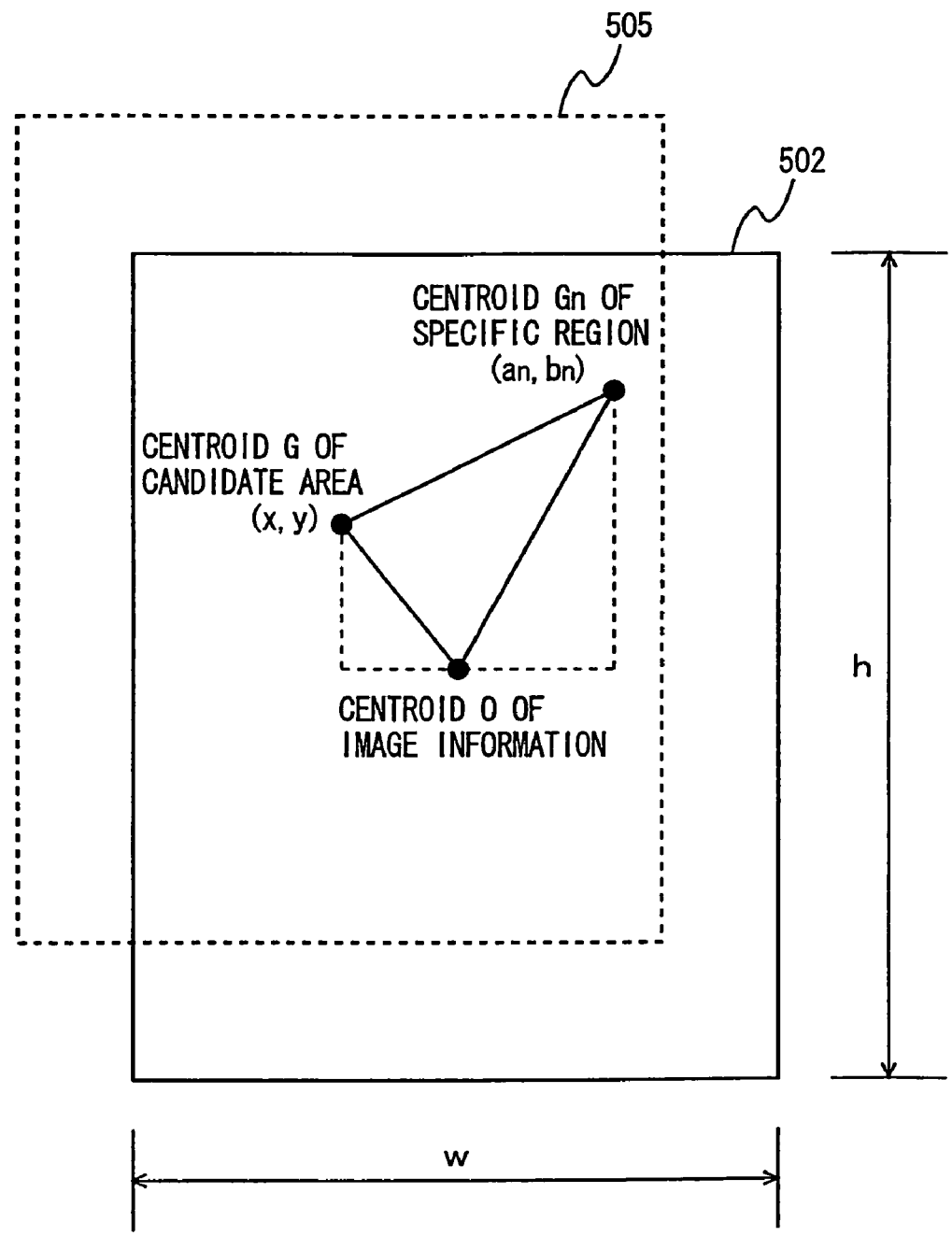
FIG. 17 shows a relative position of a specific region with respect to a candidate area.

FIG. 17 represents the relative position of a specific region with respect to a candidate area 505. When centroid O of the image area of the image information is taken as the origin, the coordinates of centroid $G_n$ of the specific region is represented as $(a_n, b_n)$. The length of the image area of the image information in the horizontal direction and vertical direction is represented as "w" and "h", respectively. The coordinates of centroid G of the candidate area to determine an extraction area is established as (x, y). An extraction area is determined by optimizing the position of centroid G of a candidate area so that the relative position of a candidate area with respect to a specific region satisfies a predetermined condition.

Image processing carried out by image processing apparatus 100A of the second embodiment corresponds to a modification of the extraction area determination process executed at step S16 in the image processing procedure of image processing apparatus 100 of the first embodiment described with reference to FIG. 3.

FIG. 18 is a flow chart of the extraction area determination processing carried out by image processing apparatus 100A of the second embodiment. Extraction area determination unit 116 of image processing apparatus 100A obtains the horizontal length w and vertical length h of the image area of the image information (step S71). The rotated coordinates $(a_n, b_n)$ of centroid $G_n$ of a specific region subjected to rotation are calculated (step S72).

Evaluation value $P_n$ (x, y) with respect to each specific region for a candidate area is calculated (step S73). The evaluation value calculated at step S73 is an evaluation value for a candidate area. Then, an evaluation function P (x, y) that is the sum of evaluation values $P_n$ (x, y) of each region calculated at step S73 is obtained (step S74). Specifically, an evaluation function P (x, y) for a candidate area represented by equation (4) is calculated at steps S73 and S74.

$$P(x, y) = \sum_n \frac{100(w - 2|x - a_n|)(h - 2|y - b_n|)}{wh} \quad (4)$$

Then, determination is made whether optimization has ended for evaluation function P (x, y) (step S75). When determination is made that optimization has ended, control proceeds to step S77. When determination is made that optimization has not ended, the centroid (x, y) of the candidate area is altered (step S76), and control returns to step S73. In the present specification, optimization is to obtain the centroid (x, y) of a candidate area with the highest value of evaluation function P (x, y).

Evaluation function P (x, y) is not limited to that represented by equation (4). Any equation as long as the relative position of an image area with respect to a specific region is represented can be employed, such as equation (5) set forth below.

$$P(x, y) = \sum_n (w - 2|x - a_n|)(h - 2|y - b_n|) \quad (5)$$

Finally, a candidate area with point (x, y) optimized at steps S73-S76 as the centroid is determined as the extraction area (step S77).

In the extraction area determination process described with reference to FIG. 18, a candidate area whose relative position of an image area with respect to a specific region satisfies a predetermined condition is determined as the extraction area. Alternatively, a candidate area with point (x, y) that optimizes evaluation function P' (x, y) determined by the relative position of the image area with respect to a specific region and the attribute of the specific region as the centroid can be determined as the extraction area. Evaluation function P' (x, y) may employ, for example, equation (6).

$$P'(x, y) = \sum_n \frac{100 K_n(w - 2|x - a_n|)(h - 2|y - b_n|)}{wh} \quad (6)$$

where $K_n$ is a factor in accordance with the attribute of that specific region. For example, factor $K_n=1.0$ when the specific region is a text region. Similarly, the factors of $K_n=0.8$, $K_n=0.8$, $K_n=0.6$, and $K_n=0$ are established when the specific region is a diagram region, a picture region, a rule mark region, and a margin region, respectively.

A candidate area with a point that optimizes the evaluation function defined by the relative position of an image area with respect to a specific region and the size of a specific region as the centroid may be determined as an extraction area. Alternatively, a candidate area with a point that optimizes the evaluation function defined by the relative position of an image area with respect to a specific region, the attribute of a specific region, and the size of a specific region as the centroid may be determined as the extraction area.

Evaluation value P or P' calculated by equation (4), (5) or (6) attains the highest value when centroid G (x, y) of the extraction area is located at the best position with respect to the centroid $G_n$ ($a_n$, $b_n$) of each specific region. Conversely, an evaluation function having the smallest value when centroid G (x, y) of the extraction area is located at the best position with respect to centroid $G_n$ ($a_n$, $b_n$) of each specific region may be used.

Figure 19B:
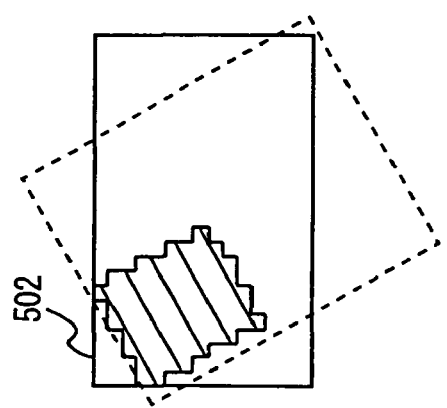
FIGS. 19A-19D are first diagrams to describe image processing carried out by the image processing apparatus of the second embodiment.
Figure 19D:
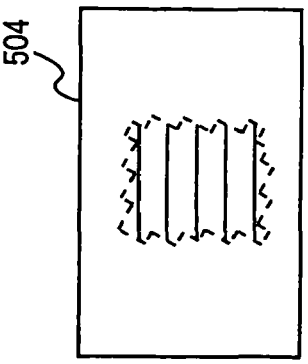
Figure 19A:
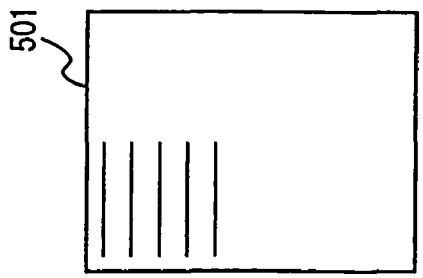

FIGS. 19A-19D are first diagrams to describe image processing carried out by image processing apparatus 100A of the second embodiment. FIG. 19A represents a document 501. Document 501 includes text information at the upper left region. Document 501 is entered as image information through image input device 200 into image processing apparatus 100A. Description is based on document 501 input in an inclined state.

FIG. 19B represents image information 502 previous to rotation. Image information 502 previous to rotation, applied to image processing apparatus 100A, includes text information. A specific region is extracted from image information 502 previous to rotation, and inclination of the image information is detected. In the present specification, the text region is extracted as the specific region in this specific region extraction process.

Figure 19C:
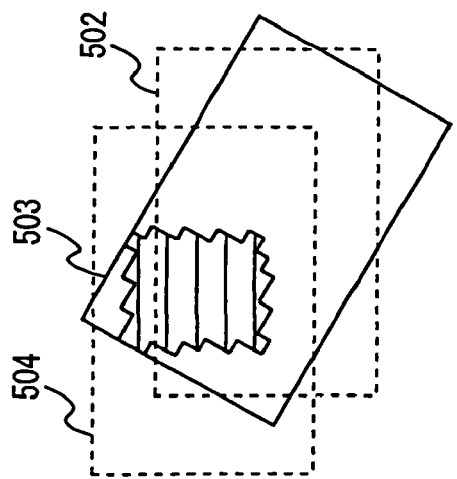

FIG. 19C represents rotated image information 503. An evaluation value is assigned to a plurality of candidate areas having the same direction and size as image information 502 previous to rotation, in accordance with the relative position to a rotated specific region. A candidate area having the best evaluation value among the plurality of candidate area assigned with an evaluation value is determined as the extraction area. Here, a candidate area with a point (x, y) that optimizes evaluation function P (x, y) represented by equation (4) described with reference to FIG. 19 as the centroid is defined as the extraction area. In the case where there is one specific region, the candidate area whose centroid corresponds to the centroid of the specific region is defined as the extraction area.

FIG. 19D represents extracted image information 504. The extraction area defined by FIG. 19C is extracted as extracted image information 504.

Figure 20A:
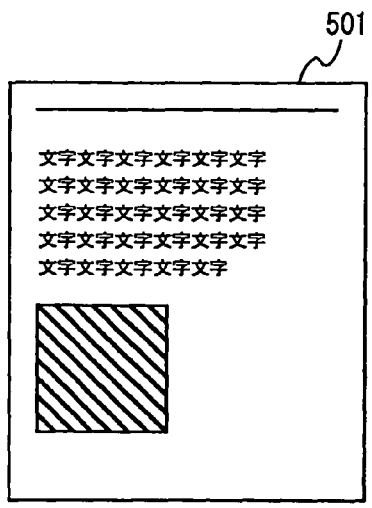
FIGS. 20A-20D are second diagrams to describe image processing carried out by the image processing apparatus of the second embodiment.

FIGS. 20A-20D are second diagrams to describe image information carried out by image processing apparatus 100A of the second embodiment. FIG. 20A represents a document 501. Document 501 includes rule mark information, text information and diagram information. Document 501 is applied as image information by image input device 200 to be provided to image processing apparatus 10A. Description is based on document 501 entered in an inclined state.

Figure 20B:
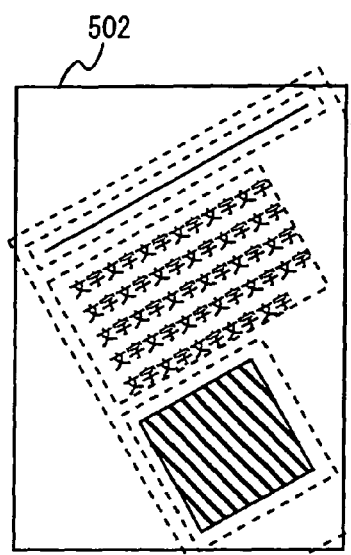

FIG. 20B represents image information 502 previous to rotation. Image information 502 previous to rotation, applied to image processing apparatus 10A, includes rule mark information, text information and diagram information. A specific region is extracted from image information 502 previous to rotation, and inclination of image information is detected. In the present specific region extraction process, a rule mark region, text region, and diagram region are extracted as specific regions.

Figure 20C:
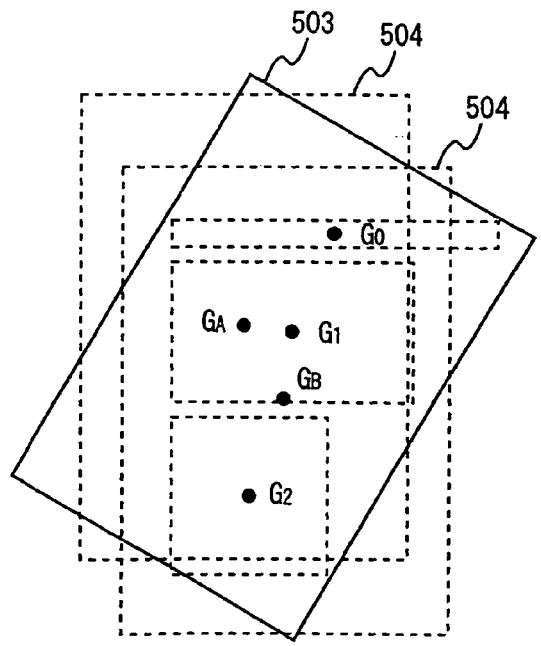

FIG. 20C represents rotated image information 503. An evaluation value is assigned to a plurality of candidate areas having the same direction and size as image information 502 previous to rotation in accordance with the relative position with respect to the rotated specific region. A candidate area exhibiting the best evaluation value among the plurality of candidate areas assigned with an evaluation value is defined as the extraction area. Here, a candidate area with point $G_B$ ($x_B$, $y_B$) optimizing evaluation function P' (x, y) represented by equation (6) described with reference to FIG. 19 as the centroid is defined as the extraction area. Specifically, evaluation value $P_B$ ($x_B$, $y_B$) with respect to centroid $G_B$ ($x_B$, $y_B$) of candidate area has a higher value than evaluation value $P_A$ ($x_A$, $y_A$) for centroid $G_A$ ($x_A$, $y_A$) of another candidate area. The another candidate area has the text region and diagram region partially protruding. In contrast, the text region and diagram region will not protrude in candidate area. However, a portion of the rule mark area protrudes. Therefore, candidate area is defined as the extraction area. Thus, loosing important information such as text information and diagram information can be prevented.

In summary, a plurality of data regions are detected from input image data. The input image data are rotated in accordance with an inclination of an image within the input image data. It is detected whether the rotated data region protrudes from the input image data previous to rotation and an area of a size identical to a size of the input image data and having a best relative position with respect to the data regions is extracted when a protrusion is detected.

Figure 20D:
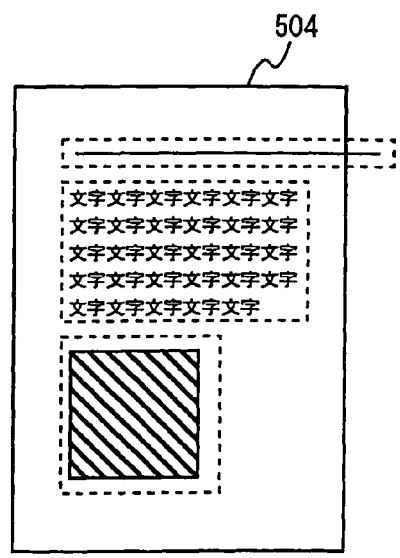

FIG. 20D represents extracted image information 504. The extraction area defined at FIG. 20C is extracted as image information 504.

In image processing apparatus 100A of the second embodiment, an evaluation value (score) is assigned to a plurality of candidate areas having the same direction and size as the image area of image information previous to rotation, in accordance with the relative position to a specific region from the rotated image information. The candidate area exhibiting the best evaluation value (score) is extracted among the plurality of candidate areas assigned with an evaluation value (score). Therefore, loosing important information from image information subjected to rotation correction can be prevented. Also, the arrangement of information included in the image information subjected to rotation correction can be optimized. As a result, the specific region is arranged at the center of the extraction area when there is only one specific region. In the case where there are a plurality of specific regions, an extraction area having the best relative position of a plurality of specific regions with respect to the extraction area is extracted.

The second embodiment is based on the description of processing carried out by image processing apparatus 100A. The present invention can be taken as an image processing method executing a process of the extraction area determination process of FIG. 18 carried out at step S16 in the process of FIG. 3, an image processing program causing a computer to execute the process of an extraction area determination process of FIG. 18 at step S16 of the process of FIG. 3, and a computer readable recording medium recorded with an image processing program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method comprising:
using a processor to:
detect a plurality of data regions from input image data in a first step,
rotate said input image data in accordance with inclination of an image within said input image data in a second step, detect whether said rotated data region protrudes from said input image data previous to rotation in a third step, and extract an area of a size identical to a size of said input image data and having a best relative position with respect to said data regions in a fourth step, when protrusion is detected at said third step.

2. The image processing method according to claim 1, wherein
said first step includes a step of detecting a specific region which satisfies a predetermined condition.

3. The image processing method according to claim 2, wherein said predetermined condition indicates a predetermined type of said data region.

4. The image processing method according to claim 3, wherein said predetermined type of data region includes at least one of a text region, a diagram region, a picture region, and a rule mark region.

5. The image processing method according to claim 3, wherein said predetermined type of data region does not include a rule mark region.

6. The image processing method according to claim 2, wherein said predetermined condition indicates a relative position of said data region with respect to other data regions.

7. The image processing method according to claim 2, wherein said relative position is defined by a centroid of said data region.

8. The image processing method according to claim 1, wherein, in said third step, detection is made whether each pixel in said rotated data region protrudes from said input image data.

9. The image processing method according to claim 1, wherein, in said third step, detection is made whether a portion of pixels in said rotated data region protrudes from said input image data.

10. The image processing method according to claim 1, wherein image data is input as image information of a smallest rectangular area including text information and diagram information.

11. The image processing method according to claim 1, wherein said data region of a predetermined type is not lost, when protrusion is detected at said third step.

12. The image processing method according to claim 1, wherein said fourth step includes a step of determining said best relative position based on a value calculated from a centroid of said data region.

13. The image processing method according to claim 12, wherein said value is calculated by different procedures respectively depending on specific types included in said data regions.

14. A computer readable medium storing a program for performing an image process comprising:
a first step of detecting a plurality of data regions from input image data,
a second step of rotating said input image data in accordance with inclination of an image within said input image data,
a third step of detecting whether said rotated data region protrudes from said input image data previous to rotation, and
a fourth step of extracting an area of a size identical to the size of said input image data and having a best relative position with respect to said data regions, when protrusion is detected at said third step.

15. The computer readable medium storing the program according to claim 14, wherein said first step includes a step of detecting a specific region which satisfies a predetermined condition.

16. The computer readable medium storing the program according to claim 15, wherein said predetermined condition indicates a predetermined type of said data region.

17. The computer readable medium storing the program according to claim 16, wherein said predetermined type of data region includes at least one of a text region, a diagram region, a picture region, and a rule mark region.

18. The computer readable medium storing the program according to claim 16, wherein said predetermined type of data region do not include being a rule mark region.

19. The computer readable medium storing the program according to claim 15, wherein said predetermined condition indicates a relative position of said data region with respect to other data regions.

20. The computer readable medium storing the program according to claim 15, wherein said relative position is defined by a centroid of said data region.

21. The computer readable medium storing the program according to claim 14, wherein, in said third step, detection is made whether each pixel in said rotated data region protrudes from said input image data.

22. The computer readable medium storing the program according to claim 14, wherein, in said third step, detection is made whether a portion of pixels in said rotated data region protrudes from said input image data.

23. The computer readable medium storing the program according to claim 14, wherein image data is input as image information of a smallest rectangular area including text information and diagram information.

24. The computer readable medium storing the program according to claim 14, wherein said data region of a predetermined type is not lost, when protrusion is detected at said third step.

25. The computer readable medium storing the program according to claim 14, wherein said fourth step includes a step of determining said best relative position based on a value calculated from a centroid of said data region.

26. The computer readable medium storing the program according to claim 25, wherein said value is calculated by different procedures respectively depending on specific types included in said data regions.

* * * * *